(12) United States Patent
Hayashi et al.

(10) Patent No.: US 8,351,682 B2
(45) Date of Patent: Jan. 8, 2013

(54) X-RAY EXAMINATION REGION SETTING METHOD, X-RAY EXAMINATION APPARATUS AND X-RAY EXAMINATION REGION SETTING PROGRAM

(75) Inventors: Hideyuki Hayashi, Maizuru (JP); Kunio Yoshida, Nagaokakyo (JP); Kiyoshi Murakami, Kyoto (JP)

(73) Assignee: Omron Corporation, Kyoto (JP)

( * ) Notice: Subject to any disclaimer, the term of this patent is extended or adjusted under 35 U.S.C. 154(b) by 440 days.

(21) Appl. No.: 12/649,984

(22) Filed: Dec. 30, 2009

(65) Prior Publication Data

US 2010/0177947 A1    Jul. 15, 2010

(51) Int. Cl.
*G06K 9/00* (2006.01)

(52) U.S. Cl. ........................... 382/147; 382/152

(58) Field of Classification Search .......... 382/131–154; 378/62, 21; 356/237.1–237.6
See application file for complete search history.

(56) References Cited

U.S. PATENT DOCUMENTS
2005/0078861 A1 * 4/2005 Usikov .......................... 382/131

FOREIGN PATENT DOCUMENTS
JP    2007-127490 A    5/2007
JP    2007-218784 A  *  8/2007 .................... 382/131

* cited by examiner

*Primary Examiner* — Tri T Ton
(74) *Attorney, Agent, or Firm* — Foley & Lardner LLP

(57) ABSTRACT

This invention enables information on a connection wiring with a substrate of a mounted component to be accurately and easily inputted in an X-ray examination apparatus. In teaching of a substrate examination, when a user inputs a two-dimensional region of a component to be examined with respect to a visible light image of the substrate, three-dimensional data is generated for the relevant region, which data is then analyzed to acquire a center coordinate, the number, the number of rows, and the number of columns on a ball terminal connecting the component to the substrate. Results such as the center coordinate acquired in such a manner may be displayed. The visible light image for the substrate is displayed in a display field of a screen. In the display field, a frame corresponding to a region acquired as an examination target is displayed in accordance with the visible light image, and a frame corresponding to each solder ball is displayed based on a position and the like of the solder ball acquired based on the three-dimensional data.

5 Claims, 17 Drawing Sheets

*FIG. 7*

| SELECTION OF BGA EXAMINATION LOGIC |
|---|
| SELECT EXAMINATION TO PERFORM WITH SELECTED BGA (ONE OR MULTIPLE) |

- ☑ BALL TERMINAL SHIFT
- ☐ BALL TERMINAL VOID
- ☑ BALL TERMINAL BRIDGE
- ☑ BALL TERMINAL SHAPE
- ☐ BALL TERMINAL WARP

☐ SELECT ALL

[ NEXT ]  [ RETURN ]

DETERMINE LOWER LEFT COORDINATE

DETERMINE UPPER RIGHT COORDINATE

DETERMINE COMPONENT REGION

COMPONENT REGION

DIVIDED REGION

RE-DIVIDED REGION

FIG. 16

RESULT OF BGA COMPONENT WINDOW AUTOMATIC ATTACHMENT — 1601

| NAME OF COMPONENT TYPE | NUMBER | FRONT /BACK | NUMBER OF PINS | NUMBER OF ROWS | NUMBER OF COLUMNS | PITCH (VERTICAL) | PITCH (HORIZONTAL) | STATE |
|---|---|---|---|---|---|---|---|---|
| BGA | 1 | FRONT | 190 | 20 | 10 | 0.3 | 0.3 | OK |
| BGA | 2 | FRONT | — | — | — | — | — | NG (RUN OUT OF WINDOW) |
| BGA | 3 | FRONT | — | — | — | — | — | NG (BALL EXTRACTION FAILED) |
| BGA | 4 | FRONT | 49 | 7 | 7 | 0.4 | 0.4 | OK |
| BGA | 5 | FRONT | 49 | 7 | 7 | 0.4 | 0.4 | OK |
| BGA | 6 | FRONT | 110 | 12 | 11 | 0.3 | 0.3 | OK |
| BGA | 7 | FRONT | — | — | — | — | — | NG (IMAGING, RECONSTRUCTION FAILED) |
| BGA | 8 | FRONT | 144 | 12 | 12 | 0.4 | 0.4 | OK |

1602

CLOSE

631 DETERMINE LOWER
LEFT COORDINATE

DETERMINE UPPER
RIGHT COORDINATE

DETERMINE UPPER RIGHT
COORDINATE OF MAIN
BODY OF COMPONENT

THREE-DIMENSIONAL
DATA OF QFP

X-RAY EXAMINATION REGION SETTING METHOD, X-RAY EXAMINATION APPARATUS AND X-RAY EXAMINATION REGION SETTING PROGRAM

BACKGROUND OF THE INVENTION

This application is based on Japanese Patent Application No. 2009-002814 filed with the Japan Patent Office on Jan. 8, 2009, the entire content of which is hereby incorporated by reference.

1. Technical Field

The present invention relates to X-ray examination methods, X-ray examination apparatuses, and X-ray examination programs, and in particular, to an X-ray examination region setting method, an X-ray examination apparatus, and an X-ray examination region setting program used to examine quality and the like of joining between a printed board and a circuit component.

2. Related Art

Conventionally, X-ray CT (Computed Tomography) is often used to examine quality and the like of a soldered state in a nondestructive examination for components soldered to a printed board (hereinafter also simply referred to as "substrate"). In the X-ray CT, an object is imaged by X-rays from a plurality of directions, and a plurality of fluorography images showing a distribution of an extent (attenuation amount) of X-ray absorption is acquired. Furthermore, a reconstruction process based on the plurality of fluorography images is performed to obtain two-dimensional data or three-dimensional data of the distribution of an X-ray absorption coefficient to be examined.

In such an examination, the same position is often examined one after the other for a great number of substrates having the same shape, in which case, teaching of the examining position to the examination apparatus is carried out using an object to be measured, which becomes a reference in positioning. The X-ray fluorography images of the object to be measured of the same type are then generated one after the other for the taught examining position, and the examination on each object to be measured is carried out based on the fluorography image.

Various techniques related to such an examination are conventionally disclosed. For instance, in a technique disclosed in Japanese Unexamined Patent Publication Nos. 2007-218784 and 2007-127490, a visible optical image of the object to be measured is displayed when accepting an input of the examining position in teaching.

SUMMARY

To examine quality and the like of a soldered state of a component with respect to a substrate, input of information for specifying a position and a shape to be examined such as a soldered position of the component is required in addition to a position of the component.

However, the conventional examination apparatus has a problem in that accuracy of the input of the information such as the soldered position is greatly influenced by an experience of a user and thus the accuracy of the examination is greatly influenced by the experience of the user when a component, in which the soldered portion is hidden by a component main body and cannot be seen, such as a BGA (Ball Grid Array) is mounted on the substrate. With respect to a package component such as a QFP (Quad Flat Package), the user needs to specify, each time, the position of soldering that exists in great numbers for every component, and thus a cumbersome task is requested on the user.

The present invention has been devised to solve the problems described above, and an object thereof is to provide an X-ray examination region setting method, an X-ray examination apparatus, and an X-ray examination region setting program in which information on a connection wiring with a substrate of a mounted component is accurately and easily inputted.

In accordance with one aspect of the present invention, the present invention relates to an X-ray examination region setting method of setting an examination region for examining a substrate using an X-ray, the method including the steps of: displaying a visible light image obtained by photographing the substrate from a direction perpendicular to a substrate surface; accepting an input of information for specifying a range in which a component mounted on the substrate exists in the displayed image; generating three-dimensional reconstruction data from an X-ray fluorography image obtained by performing X-ray fluorography on a three-dimensional region including a region of the component within the specified range; specifying the information on a position of a wiring for connecting the substrate and the component by processing the three-dimensional reconstruction data; and specifying a region corresponding to the wiring in the three-dimensional region from the specified information on the position of the wiring, and setting the specified region as the examination region.

Preferably, the X-ray examination region setting method according to the present invention further includes a step of displaying the set examination region and the visible light image in superimposed manner. In the X-ray examination region setting method according to the present invention, preferably, in the step of specifying the information on the position of the wiring, data of a predetermined range in the perpendicular direction in the three-dimensional reconstruction data is a processing target, and the predetermined range includes a position in the perpendicular direction where an accumulated value of luminance has a peak, where data in which each pixel of a plurality of cross-sectional images parallel to the perpendicular direction of the three-dimensional reconstruction data and parallel to each other is overlapped in a vertical direction of a tomographic image are produced, and the accumulated value of luminance of the data is calculated at each position in the perpendicular direction.

In the X-ray examination region setting method according to the present invention, preferably, the predetermined range is a range including the position in the perpendicular direction where the accumulated value of the luminance has a peak, and in which the position in the perpendicular direction fluctuates by a tilt of the substrate assumed in a range of the three-dimensional reconstruction data to be processed.

In accordance with another aspect of the present invention, the present invention relates to an X-ray examination apparatus for examining a substrate using an X-ray, the X-ray examination apparatus including: a visible light image photographing unit for photographing a visible light image of the substrate from a direction perpendicular to a substrate surface; a display unit for displaying the photographed visible light image; an input unit for inputting information for specifying a range in which a component mounted on the substrate exists in the displayed image; an X-ray image photographing unit for photographing an X-ray fluorography image; an image generation unit for generating a three-dimensional reconstruction image from the X-ray fluorography image photographed by the X-ray image photographing unit with respect to the three-dimensional region including a range, where the component exists, specified by the input unit; a specifying unit for specifying the information on a position of a wiring for connecting the substrate and the component by processing data of the three-dimensional reconstruction image; and a setting unit for specifying a region corresponding to the wiring in the three-dimensional region from the specified information on the position of the wiring, and setting the specified region as an examination region.

In accordance with still another aspect of the present invention, the present invention relates to a computer readable X-ray examination region setting program, executed by a computer of an X-ray examination apparatus for examining a substrate using an X-ray, for setting an examination region for examining the substrate, the program causing the computer of the X-ray examination apparatus to execute the steps of: displaying a visible light image obtained by photographing the substrate; accepting an input of information for specifying a position of a component mounted on the substrate and a range in which the component is positioned with respect to the displayed image; generating three-dimensional reconstruction data based on an X-ray fluorography image of the specified range in which the component is positioned; specifying the information on the position of the wiring for connecting the substrate and the component by processing the data of the three-dimensional reconstruction data; and specifying a region corresponding to the wiring from the specified information on the position of the wiring, and displaying the specified region so as to be aligned with the position in the visible light image.

In the present invention, if the user inputs information specifying the position of a component mounted on a substrate while looking at a visual light image of the substrate, information on the position of the wiring for the relevant component can be specified based on the X-ray fluorography image for the relevant position.

Therefore, according to the present invention, information on the connection wiring of the component and the substrate can be obtained based on the X-ray fluorography image with respect to the component mounted on the substrate in the teaching of the examination of the substrate, and thus the relevant information is accurately and easily inputted in the teaching.

BRIEF DESCRIPTION OF THE DRAWINGS

FIG. 7 is a view schematically showing one example of a screen displayed in the BGA attaching process of FIG. 6;

FIG. 16 is a view further schematically showing another example of a screen displayed in the BGA attaching process of FIG. 6;

DETAILED DESCRIPTION

Figure 1:
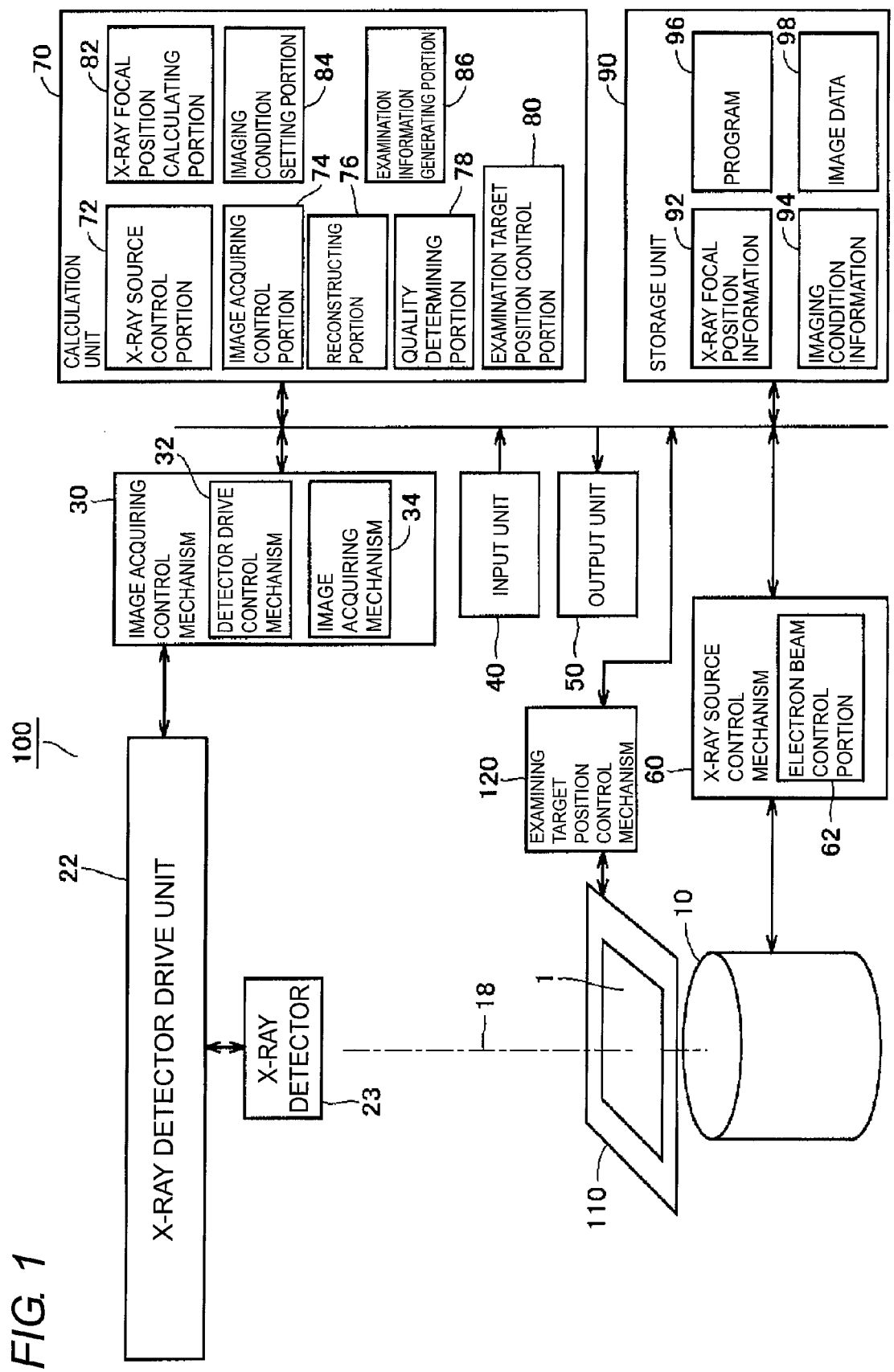
FIG. 1 is a schematic block diagram of an X-ray examination apparatus according to one embodiment of an X-ray examination apparatus of the present invention.

Hereinafter, preferred embodiments of the present invention will be described with reference to the drawings. The same reference numerals are denoted for the same portions in the following description. Names and functions thereof are the same. Therefore, detailed description thereof will not be repeated. In the present specification, an X-axis, a Y-axis, and a Z-axis are axes orthogonal to each other.

(Outline of Configuration)

A configuration of an X-ray examination apparatus 100 according to the present embodiment will be described with reference to FIG. 1. FIG. 1 is a schematic block diagram of the X-ray examination apparatus 100 according to the present embodiment.

The X-ray examination apparatus 100 includes an X-ray source 10 for outputting an X-ray 18, an X-ray detector 23, an image acquiring control mechanism 30, and an examination target drive mechanism 110 for moving a position of the examination target 1. The X-ray examination apparatus 100 further includes an input unit 40, an output unit 50, an X-ray source control mechanism 60, an examination target position control mechanism 120, a calculation unit 70, and a storage unit 90.

The examination target 1 is arranged between the X-ray source 10 and the X-ray detector 23. In the present embodiment, the examination target 1 is a circuit substrate mounted with components. In FIG. 1, the X-ray source 10, the examination target 1, and the X-ray detector 23 are installed in order from the bottom, but the X-ray detector 23, the examination target 1, and the X-ray source 10 may be arranged in such an order from the bottom from a standpoint of maintenance of the X-ray source.

The X-ray source 10 is controlled by the X-ray source control mechanism 60, and irradiates the examination target 1 with the X-ray 18. In the present embodiment, the examination target 1 is a substrate mounted with the circuit components.

The examination target 1 is moved by the examination target drive mechanism 110. Specific configuration of the examination target drive mechanism 110 will be described later. The examination target position control mechanism 120 controls an operation of the examination target drive mechanism 100 based on an instruction from the calculation unit 70.

The X-ray detector 23 is a two-dimensional X-ray detector for detecting the X-ray outputted from the X-ray source 10 and transmitted through the examination target 1, and creating an image. I. I. (Image Intensifier) tube and FPD (Flat Panel Detector) may be used for the X-ray detector 23. The FPD is desirably used for the X-ray detector 23 from the standpoint of installation space. The X-ray detector 23 is desirably highly sensitive, and is particularly desirably an FPD of direct conversion type that uses CdTe so as to be used in the in-line examination.

The image acquiring control mechanism 30 includes a detector drive control mechanism 32, and an image data acquiring unit 34. The detector drive control mechanism 32 controls the operation of an X-ray detector drive unit 22 to move the X-ray detector 23 based on the instruction from the calculation unit 70. The image data acquiring unit 34 acquires image data of the X-ray detector 23 specified from the calculation unit 70.

The input unit 40 is an operation input device for accepting instruction input and the like from a user. The output unit 50 is a device for outputting a measurement result and the like to the outside. In the present embodiment, the output unit 50 is a display for displaying an X-ray image and the like configured by the calculation unit 70.

In other words, the user can execute various inputs through the input unit 40, and various calculation results obtained by the processing of the calculation unit 70 can be displayed on the output unit 50. The image displayed on the output unit 50 may be outputted for the visual determination on the quality by the user, or may be outputted as a quality determination result of a quality determining portion 78, to be described later.

The X-ray source control mechanism 60 includes an electron beam control portion 62 for controlling the output of the electron beam. The electron beam control portion 62 receives the specification of an X-ray focal position, and X-ray energy (tube voltage, tube current) from the calculation unit 70. The specified X-ray energy differs depending on the configuration of the examination target.

The calculation unit 70 executes a program 96 stored in the storage unit 90 to control each portion or perform a predetermined calculation process. The calculation unit 70 includes an X-ray source control portion 72, an image acquiring control portion 74, a reconstructing portion 76, a quality determining portion 78, an examination target position control portion 80, an X-ray focal position calculating portion 82, an imaging condition setting portion 84, and an examination information generating portion 86.

The X-ray source control portion 72 determines the X-ray focal position and the X-ray energy, and sends a command to the X-ray source control mechanism 60.

The image acquiring control portion 74 sends a command to the image acquiring control mechanism 30 so that the X-ray detector 23 acquires images. The image acquiring control portion 74 also acquires image data from the image acquiring control mechanism 30.

The reconstructing portion 76 reconstructs three-dimensional data from a plurality of pieces of image data acquired by the image acquiring control portion 74.

The quality determining portion 78 obtains a height (surface height) of a substrate surface mounted with components, and determines the quality of the examination target based on a tomographic image of the substrate height. An algorithm for performing the quality determination, or the input information to the algorithm differ depending on the examination target, and thus the quality determining portion 78 obtains such an algorithm and input information from the imaging condition information 94.

The examination target position control portion 80 controls the examination target drive mechanism 110 through the examination target position control mechanism 120.

The X-ray focal position calculating portion 82 calculates the X-ray focal position, an irradiation angle, and the like with respect to an examining area when examining a certain examining area of the examination target 1.

The imaging condition setting portion 84 sets a condition (e.g., application voltage to X-ray source, imaging time, and the like) in outputting the X-ray from the X-ray source 10 according to the examination target 1.

The storage unit 90 includes the X-ray focal position information 92, the imaging condition information 94, the program 96 for realizing each function executed by the calculation unit 70, and image data 98 imaged by the X-ray detector 23. The X-ray focal position information 92 includes the X-ray focal position calculated by the X-ray focal position calculating portion 82. The imaging condition information 94 includes the imaging condition set by the imaging condition setting portion 84, and the information related to the algorithm for performing the quality determination.

The storage unit 90 merely needs to be able to store data. The storage unit 90 is configured by a storage device such as RAM (Random Access Memory), an EEPROM (Electrically Erasable and Programmable Read-Only Memory), and an HDD (Hard Disc Drive).

(Specific Configuration)

Figure 2:
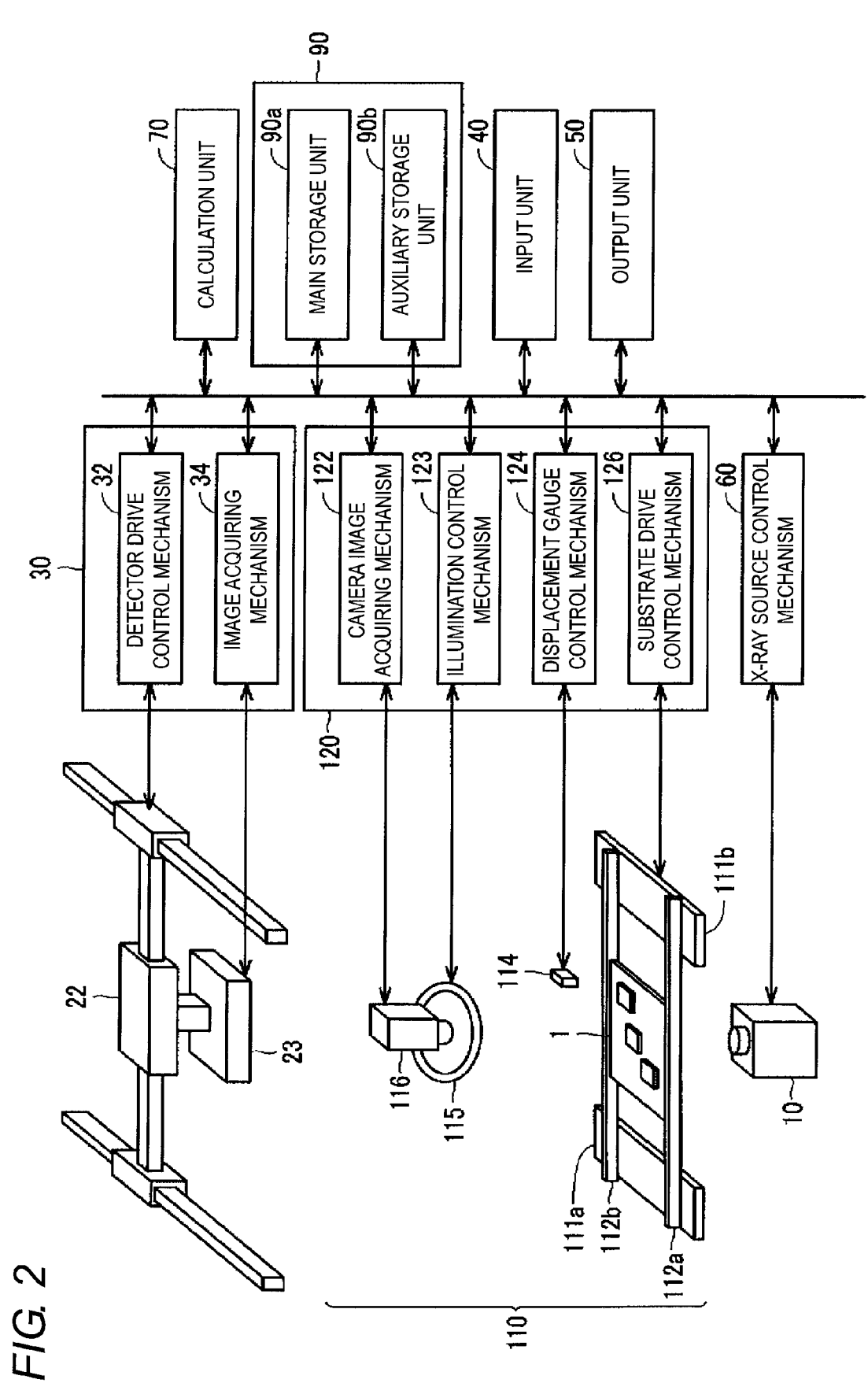
FIG. 2 is a view describing a specific configuration of the X-ray examination apparatus of FIG. 1.

A specific configuration of the X-ray examination apparatus 100 according to the present embodiment will be described with reference to FIG. 2. FIG. 2 is a view describing the configuration of the X-ray examination apparatus 100 according to the present embodiment. In FIG. 2, the same reference numerals are denoted for the portions same as in FIG. 1. FIG. 2 shows the portions directly related to the control of the X-ray focal position, the control of the X-ray detector position, the control of the examination target position, and the like and necessary for the description extracted from the portions shown in FIG. 1.

The X-ray source 10 is a scanning X-ray source capable of scanning the position (X-ray focal position), where the X-ray generates, in one direction. The X-ray source 10 generates the X-ray according to the command from the calculation unit 70 through the X-ray source control mechanism 60.

The X-ray source 10 is a sealed X-ray source, and is disposed at the upper part or the lower part of the X-ray examination apparatus 100. The target of the X-ray source 10 may be transmissive or reflective. The X-ray source 10 is assumed to be attached to a movable member (not shown) and is movable in a vertical direction.

The X-ray detector 23 is arranged at a position facing the X-ray source 10 with the examination target 1 (substrate) in between. The X-ray detector 10 creates an image from the X-ray radiated from the X-ray source 10. The X-ray detector 23 is attached to the X-ray detector drive unit 22. The X-ray detector drive unit 22 is a three-dimensional stage that enables the X-ray detector 23 to be movable in a horizontal direction and the vertical direction.

The examination target drive mechanism 110 is installed between the X-ray source 10 and the X-ray detector 23. The examination target drive mechanism 110 includes stages 111a, 111b, and substrate rails 112a, 112b attached to the stages 111a, 111b. The stages 111a, 111b can move the examination target 1 in parallel in the horizontal direction. Each substrate rail 112a, 112b fixes the substrate by sandwiching the examination target 1 from above and below.

The operations of the stages 111a, 111b and the substrate rails 112a, 112b are controlled by the substrate drive control mechanism 126.

With reference to FIG. 2, the X-ray examination apparatus 100 includes a displacement gauge 114 and an optical camera 116 (which are not shown in FIG. 1). The displacement gauge 114 measures a distance to the substrate. Therefore, the displacement gauge 114 can measure a warp of the substrate, which is specifically described later. The optical camera 116 photographs the substrate with visible light. The optical camera 116 is used in photographing a fiducial mark for setting the examining position. The displacement gauge 114 and the optical camera 116 are evacuated to a region not irradiated with the X-ray by an evacuation mechanism (not shown) so as not to be exposed to the X-ray at the time of imaging by the X-ray.

An illumination device 115 is attached to the optical camera 116 by an attachment mechanism (not shown). The illumination device 115 uniformly lights the entire field of view (imaging area) of the optical camera 116. In the present embodiment, the illumination device 115 is a ring-shaped LED (Light Emitting Diode) light source that emits white light, but the present invention is not limited thereto, and other light sources may be used. The illumination device may not necessarily be integrally arranged with the optical camera 116, and may be arranged independent from the optical camera 116. Similar to the optical camera 116, and the like, the illumination device 115 is also evacuated to the region not irradiated with the X-ray by an evacuation mechanism (not shown) so as not to be exposed to the X-ray at the time of imaging by the X-ray.

According to the above configuration, the X-ray examination apparatus 100 can change a ratio (enlargement factor) of the radiation source—substrate distance and the radiation source—detector distance. Consequently, the X-ray examination apparatus 100 can change a size (therefore, resolution) of the examination target 1 imaged by the X-ray detector 23.

The X-ray examination apparatus 100 operates the substrate and the X-ray detector 23 so that the substrate can be imaged from various directions. In the present embodiment, the three-dimensional data of the examination target 1 is generated using a three-dimensional data generation method called CT (Computer Tomography) based on the imaging results from the various directions.

In the present embodiment, the X-ray examination apparatus 100 is used in the in-line examination. The examination target drive mechanism 110 further includes a mechanism for carrying in and out the substrate for the in-line examination. The carry-in/out mechanism of the substrate is not shown in FIG. 2. A belt conveyor arranged on the substrate rail is generally used for the carry-in/out mechanism of the substrate. Alternatively, a rod called a pusher may be used for the carry-in/out mechanism. The substrate can be moved by sliding the substrate on the rail with the pusher.

A common central processing unit (CPU) can be used for the calculation unit 70. The storage unit 90 includes a main storage unit 90a and an auxiliary storage unit 90b. A memory can be used for the main storage unit 90a, and an HDD (Hard Disc Drive) can be used for the auxiliary storage unit 90b. That is, a common calculator can be used for the calculation unit 70 and the storage unit 90.

(Flow of Examination Process)

Figure 3:
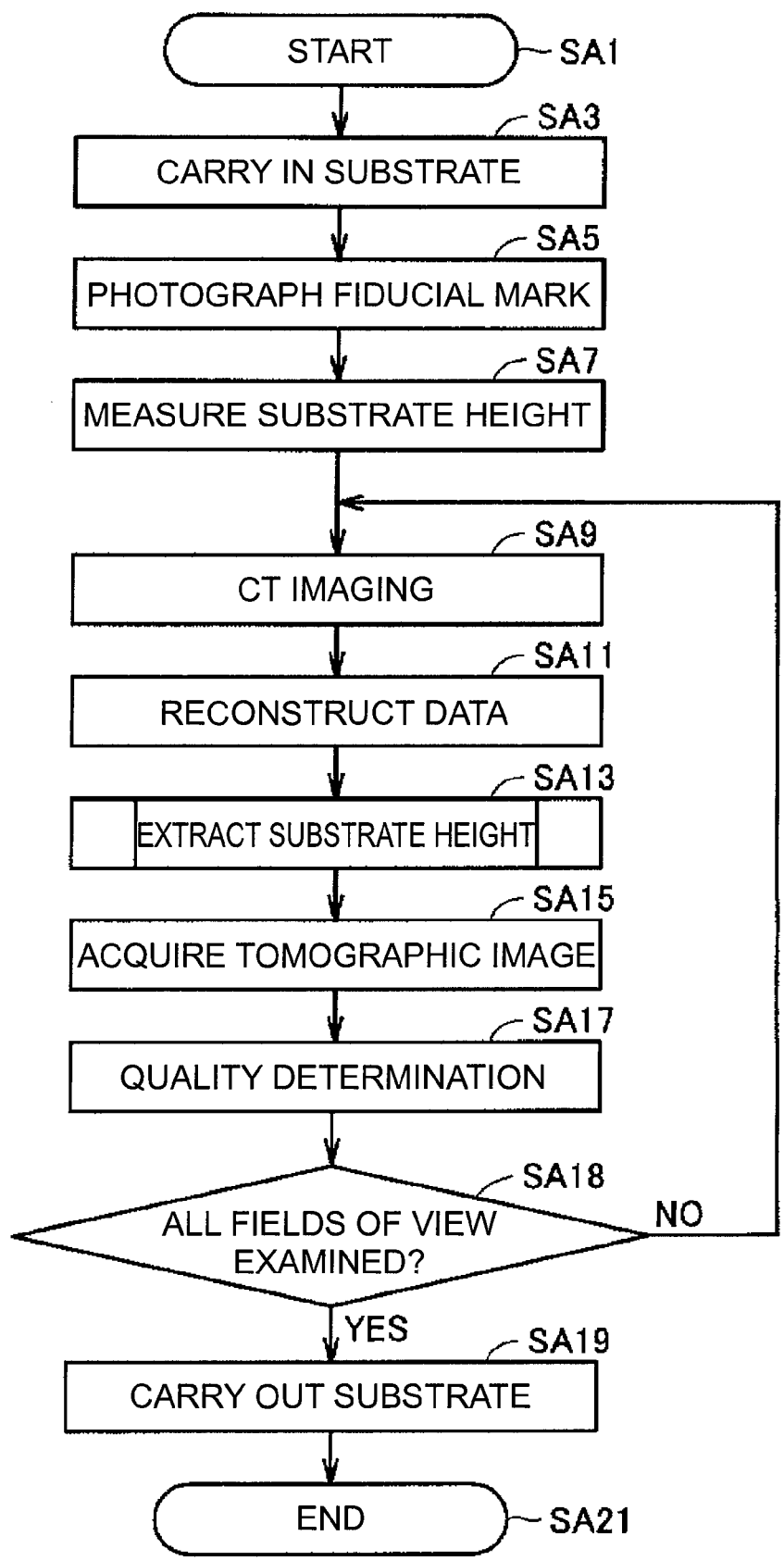
FIG. 3 is a view showing a flow of the X-ray examination executed by the X-ray examination apparatus of FIG. 1 in a form of a flowchart.

FIG. 3 is a view showing a flow of the X-ray examination according to the present embodiment in a form of a flowchart. The flow of the entire X-ray examination according to the present embodiment will be described with reference to FIG. 3.

With reference to FIG. 3, first, when the process starts (step SA1), the X-ray examination apparatus 100 carries in the substrate to a defined position in the X-ray examination apparatus 100 by means of the examination target drive mechanism 110 (step SA3). The defined position is usually preferably set to the middle of the X-ray examination apparatus 100, that is, the middle of the X-ray irradiation range. However, the defined position may be a position where the X-ray detector 23 can image the X-ray fluorography image of the substrate.

In step SA5, the X-ray examination apparatus 100 photographs the fiducial mark with the optical camera 116. The X-ray examination apparatus 100 also corrects the substrate position, as necessary, based on the position of the fiducial mark. Specifically, the X-ray examination apparatus 100 moves the substrate position similar to the time of carry-in. The X-ray examination apparatus 100 can recognize a shift of the substrate position and a tilt of the substrate that occurred at the time of carrying in the substrate, and correct the shift and the tilt through such processes.

In step SA7, the x-ray examination apparatus 100 measures the height of the substrate in the reconstructing region (hereinafter also referred to as field of view) using the displacement gauge 114. The X-ray examination apparatus 100 saves the measured height of the substrate in the main storage unit 90a. The saved height of the substrate is used at the time of CT imaging, to be described later.

If the examination target 1 includes a plurality of fields of view such as when the entire examination target 1 cannot be imaged in one imaging, the X-ray examination apparatus 100 measures the substrate height for all fields of view before performing the CT imaging. This is because the displacement gauge 114 needs to be evacuated so as not to be exposed at the time of CT imaging. The overall examination time can be reduced by measuring all substrate heights in advance compared to when measuring the substrate height for every CT imaging of each field of view.

In step SA9, the X-ray examination apparatus 100 images one field of view from a plurality of directions in the examination target 1. In the present embodiment, the X-ray examination apparatus 100 images the field of view from a plurality of directions by moving the substrate and the X-ray detector 23 so as to draw a circular orbit in the horizontal direction. The positions of the substrate and the X-ray detector 23 at the time of imaging are determined by an irradiation angle θR, a radiation source—substrate distance (FOD), and a radiation source—detector distance (FID). The substrate and the X-ray detector 23 are arranged so that the center of the field of view is imaged at the center of the X-ray detector 23. The orbit of the substrate and the X-ray detector 23 may not be a circle, and may be a rectangle, a line, and the like.

The number of imaging can be set by the user. The user preferably determines the number of imaging based on the desired accuracy of the reconstruction data. The number of imaging is normally about 4 to 256. However, the number of imaging is not limited thereto. The X-ray examination apparatus 100 may also image images of a number exceeding 256.

In step SA11, the X-ray examination apparatus 100 generates the reconstruction data from the imaged image in a plurality of directions. Various methods are proposed for the reconstruction process, and a Feldkamp method and the like may be used.

In step SA13, the X-ray examination apparatus 100 extracts the substrate height, that is, the height of the substrate surface where the components are arranged. The details on the process performed in step SA13 will be described later.

In step SA15, the X-ray examination apparatus 100 acquires the tomographic image of the height spaced apart by a predetermined distance in the height direction from the substrate height as an examination image to use in the examination. The distance between the height of the examination image and the substrate height is set by the user. This distance is preferably set according to the design data of the examination target 1 and the examination method. In the present embodiment, the tomographic image of the height slightly spaced apart to the side arranged with the components from the surface of the substrate arranged with the components is set as the examination image.

In step SA17, the X-ray examination apparatus 100 performs the determination on the quality of the field of view using the examination image. In other words, the X-ray examination apparatus 100 examines a wet property of solder after heating, presence of void and bridge of the solder, presence of foreign substances, and the like. Various quality determination methods are well known, and the X-ray examination apparatus 100 may use the quality determination method suited to the examination item.

Figure 4A:
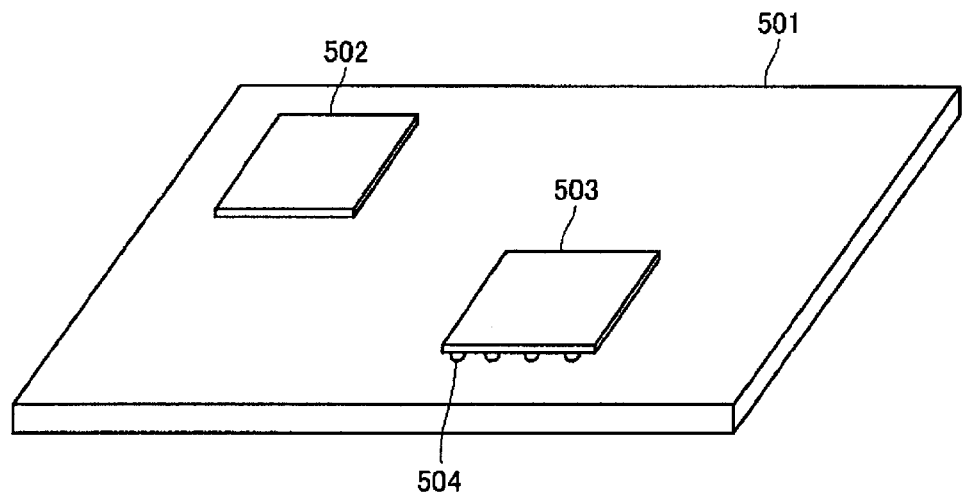
FIGS. 4A to 4C are views describing a mode of quality determination of a substrate in the X-ray examination apparatus of FIG. 1.
Figure 4B:
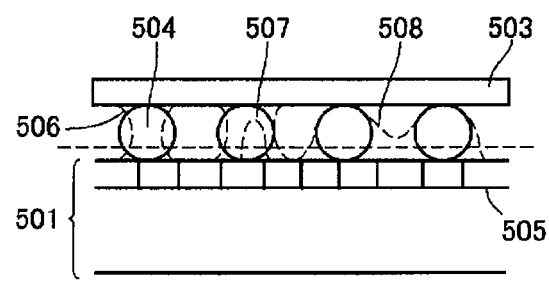
Figure 4C:
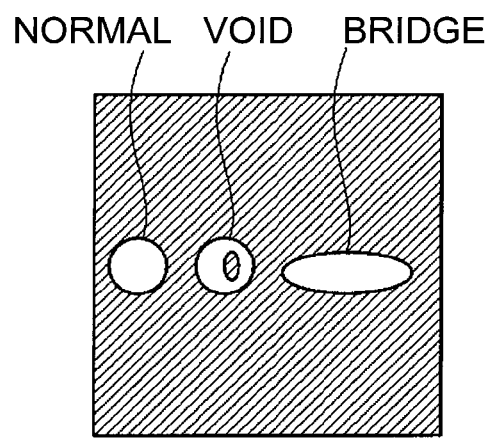

In the present embodiment, the quality determining portion 78 determines the quality of the mounting substrate based on the solder area within a binarized image. The mode of the quality determination of the substrate in the present embodiment will be described below with reference to FIGS. 4A to 4C. FIGS. 4A to 4C are views describing the quality determination based on a solder area within the binarized image.

FIG. 4A is a perspective view of the substrate mounted with electronic components. A first component 502 and a second component 503 are mounted on the substrate 501. The second component 503 is physically and electrically connected to the substrate 501 by a BGA (Ball Grid Array) 504 and the like.

FIG. 4B is a cross-sectional view taken along a cross-section perpendicular to the surface of the substrate 501 at a connecting area of the substrate 501 and the second component 503. The BGA 504 connects the second component 503 and the surface layer 505 of the substrate 501. The BGA 504 is heated, and deforms to a state 506 after heating. However, a void 507 may form in the state 506 after heating. A plurality of solder balls (hereinafter also referred to as "ball terminal") sometimes bonds to form a bridge 508.

The X-ray examination apparatus 100 generates three-dimensional data of a region expected to include the solder ball, cuts out the three-dimensional data, and creates the tomographic image. The X-ray examination apparatus 100 binarizes the created tomographic image, and acquires the binarized image in which the image is separated to the solder and the others. A typical binarization process such as a discrimination analysis method may be used for the binarization process. The examination apparatus performs labeling of a white (or 1) portion from the binarized image, and acquires a labeling image in which the solder is distinguished. A typical labeling process that determines presence of coupling by raster scan may be used for the labeling process.

One example of a cross-section parallel to the surface of the substrate 501 is shown in FIG. 4C. FIG. 4C is a cross-sectional view of the connecting area taken along the cross-section shown with a broken line in FIG. 4B. In FIG. 4C, the solder is indicated in white and portions other than the solder is shown with diagonal lines. Three types of states, normal, void, and bridge are shown. With reference to FIG. 4C, a portion without the solder forms within the solder if the void 507 is present. The solder is observed in a wide range compared to the normal time if the bridge 508 is present.

The examination apparatus counts the area (number of pixels of white or 1) of the respective solder from the labeling image, and obtains the area of the solder. The examination apparatus determines the quality of the solder joint surface by assuming as non-defective if the area is within a constant range and as defective in other cases. A threshold value of the constant range is usually set by the user in advance.

Returning back to FIG. 3, the X-ray examination apparatus 100 determines whether or not the quality determination is performed on all fields of view in step SA18. If a field of view in which the quality determination is not performed exists (NO in step SA18), the X-ray examination apparatus 100 repeats the processes from the CT imaging (step SA9). If the quality determination is performed on all fields of view (YES in step SA18), the process proceeds to step SA19.

In step SA19, the X-ray examination apparatus 100 carries the substrate out of the X-ray examination apparatus 100. Specifically, the X-ray examination apparatus 100 moves the substrate to the outside of the X-ray examination apparatus 100 by means of the examination target drive mechanism 110.

The X-ray examination apparatus 100 then terminates the examination on one examination target 1 (step SA21). The X-ray examination apparatus 100 repeats the series of processes from step SA1 to step SA21 described above when executing the in-line examination for a plurality of examination targets 1.

(Flow of Teaching Process)

Figure 5:
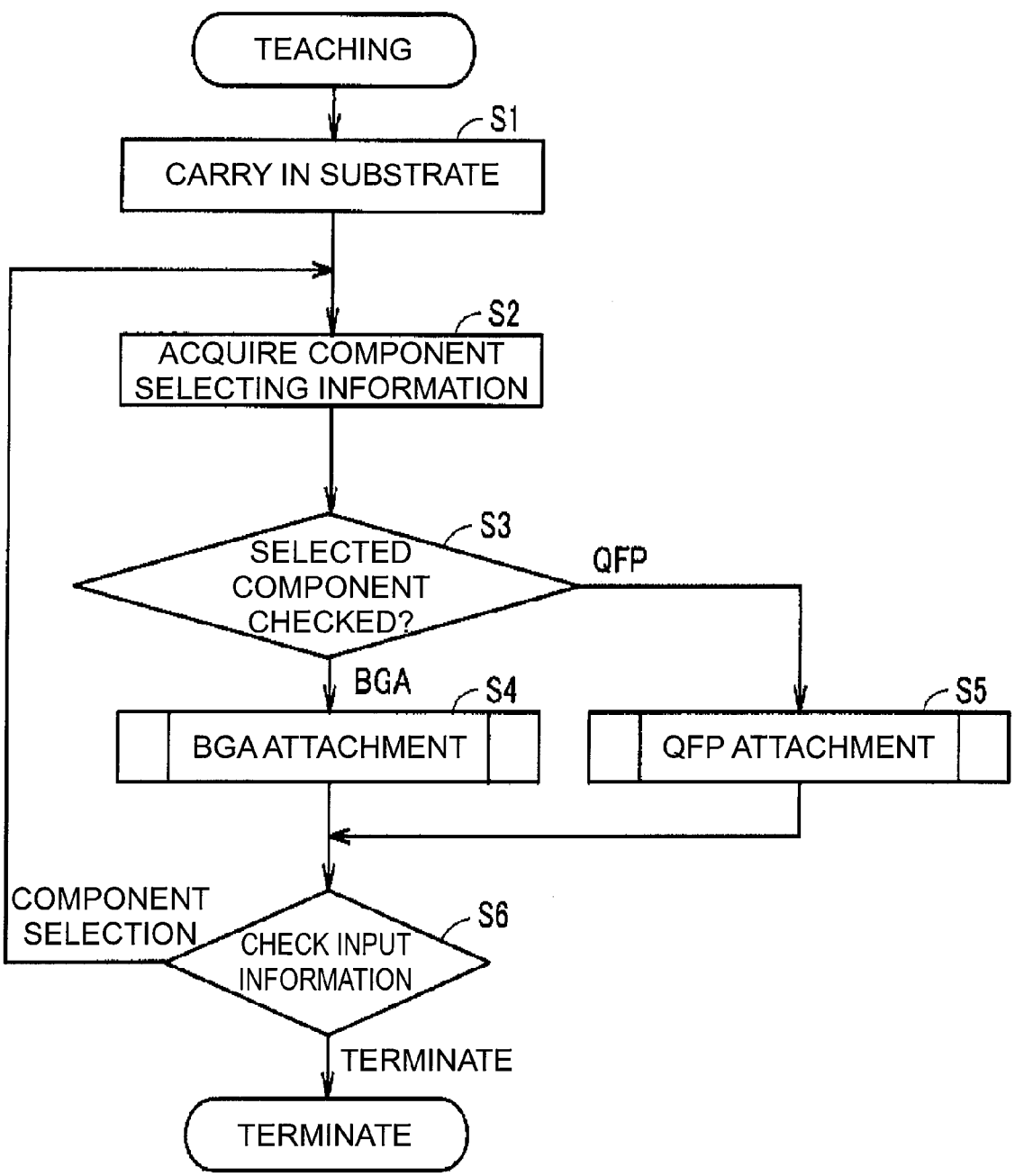
FIG. 5 is a flowchart of a teaching process executed by the X-ray examination apparatus of FIG. 1.

The information for teaching the examination position and the like in the examination target 1 may be inputted in advance to the X-ray examination apparatus 100 for the examination of the examination target 1. The content of the process (teaching process) of inputting such information will be described with reference to FIG. 5 showing a flowchart of the relevant process. The teaching process is realized by the examination information generating portion 86 in the X-ray examination apparatus 100. The information related to the teaching of the examination generated in the teaching process is stored in the storage unit 90 as imaging condition information 94.

With reference to FIG. 5, the X-ray examination apparatus 100 first carries in the substrate to the defined position in the X-ray examination apparatus 100 in step S1 in the teaching process. The defined position is usually preferably set to the middle of the X-ray examination apparatus 100, that is, the middle of the X-ray irradiation range. However, the defined position may be a position where the X-ray detector 23 can image the X-ray fluorography image of the substrate. In step S1, the X-ray examination apparatus 100 photographs the fiducial mark on the substrate with the optical camera 116. The X-ray examination apparatus 100 also corrects the substrate position, as necessary, based on the position of the fiducial mark. Specifically, the X-ray examination apparatus 100 moves the substrate position similar to the time of carry-in. The X-ray examination apparatus 100 can recognize the shift of the substrate position and the tilt of the substrate that occurred at the time of carrying in the substrate, and correct the shift and the tilt through such processes.

In step S2, the X-ray examination apparatus 100 acquires information for selecting the type of component from which the information is to be acquired, and proceeds the process to step S3. The information for selecting the type of component is inputted by the user through the input unit 40, and the like.

The information for selecting the component includes information on the position and the size of the component, where CAD (Computer Aided Design) data and the mount data on the substrate of the examination target may be used to acquire such information. That is, the information for selecting the component may be acquired by displaying the information retrieved from the CAD data, the mount data, and the like on the output unit 50, and accepting the operation for confirmation performed by the user on the displayed information or the information of after the correction obtained by the operation of adding corrections, which are performed by the user as necessary with respect to the displayed information.

In step S3, the X-ray examination apparatus 100 checks the type of component acquired in step S2. The process proceeds to step S4 if the selected component is the BGA, and process proceeds to step S5 if the selected component is the QFP.

In step S4, the X-ray examination apparatus 100 executes the BGA attaching process, and proceeds the process to step S6. The BGA attaching process is a process of setting the examination information on the BGA mounted on the substrate in the teaching of the examination information (information for teaching the examining position and the like) of the substrate.

In step S5, the X-ray examination apparatus 100 executes the QFP attaching process, and proceeds the process to step S6. The QFP attaching process is a process of setting the examination information on the QFP mounted on the substrate in the teaching of the examination information (information for teaching the examining position and the like) of the substrate.

In step S6, whether or not the information inputted to the input unit 40 is the information for further selecting the component or the information for terminating the teaching process is determined, where the process returns to step S2 if determined as the information for selecting the component, and the teaching process is terminated if determined as the information for terminating the teaching process.

(BGA Attaching Process)

Figure 6:
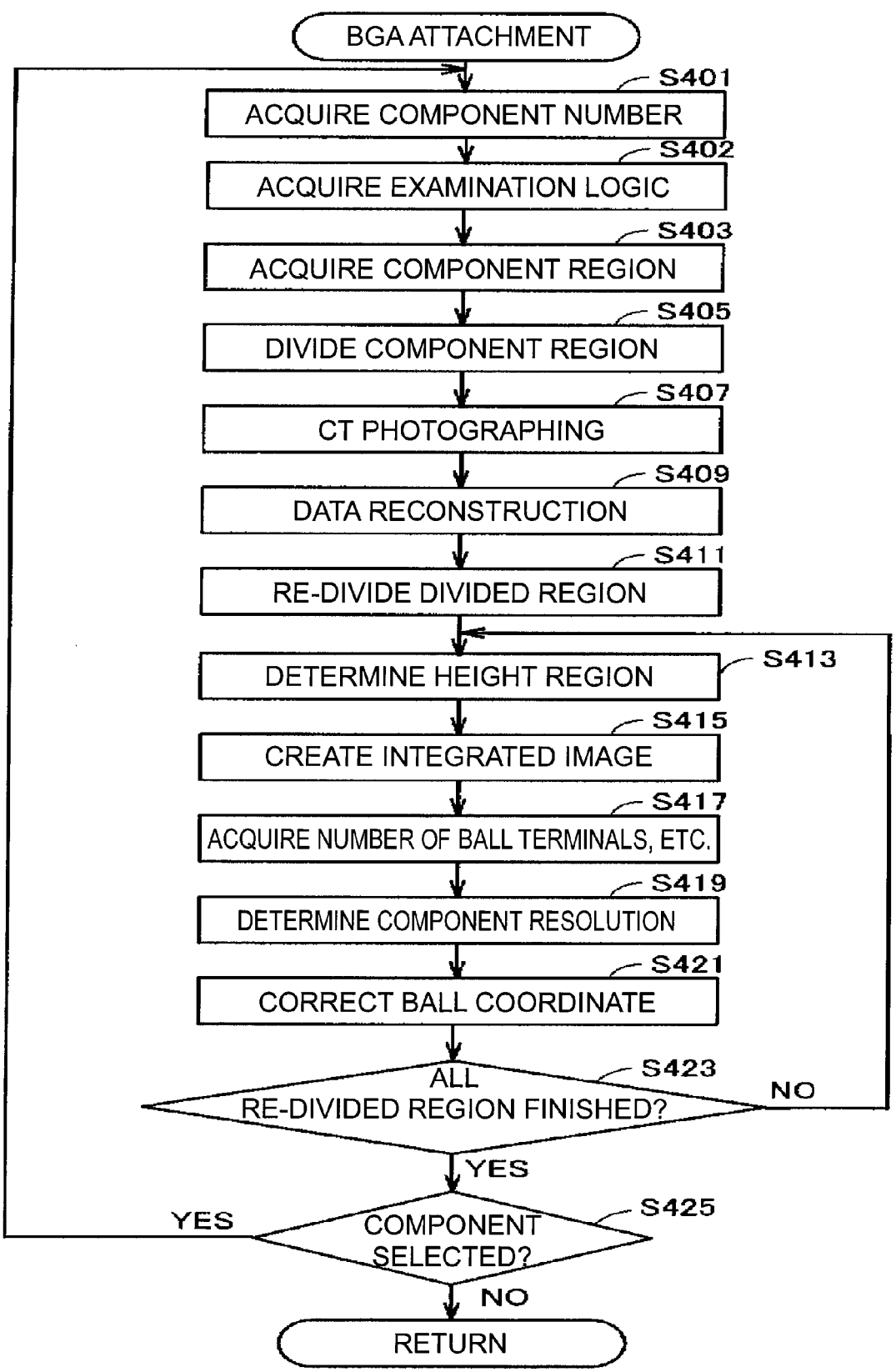
FIG. 6 is a flowchart of a sub-routine of a BGA attaching process of FIG. 5.

FIG. 6 is a flowchart of a sub-routine of the BGA attaching process in step S4.

With reference to FIG. 6, in the BGA attaching process, the X-ray examination apparatus 100 first acquires specification of a number for the component to be processed in step S401. The component to be processed refers to one BGA in a plurality of BGAs mounted on the substrate that is the examination target 1.

In step S402, the X-ray examination apparatus 100 acquires information for selecting an examination logic for the component to be processed, and proceeds the process to step S403.

In step S402, a screen 601, such as that shown in FIG. 7, is displayed on the output unit 50. In a display field 601A of the screen 601, a defective mode (void, bridge, and the like) of the solder joint surface as described with reference to FIG. 4, and the assumed defective mode such as a positional shift are listed. The user inputs information for selecting the logic of performing the examination on the component to become the examination target with respect to the screen. The X-ray examination apparatus 100 acquires the information selected as the examination logic based on the information inputted to the screen.

In step S403, the X-ray examination apparatus 100 acquires information specified as a region of the component on the substrate, and proceeds the process to step S405.

Figure 8:
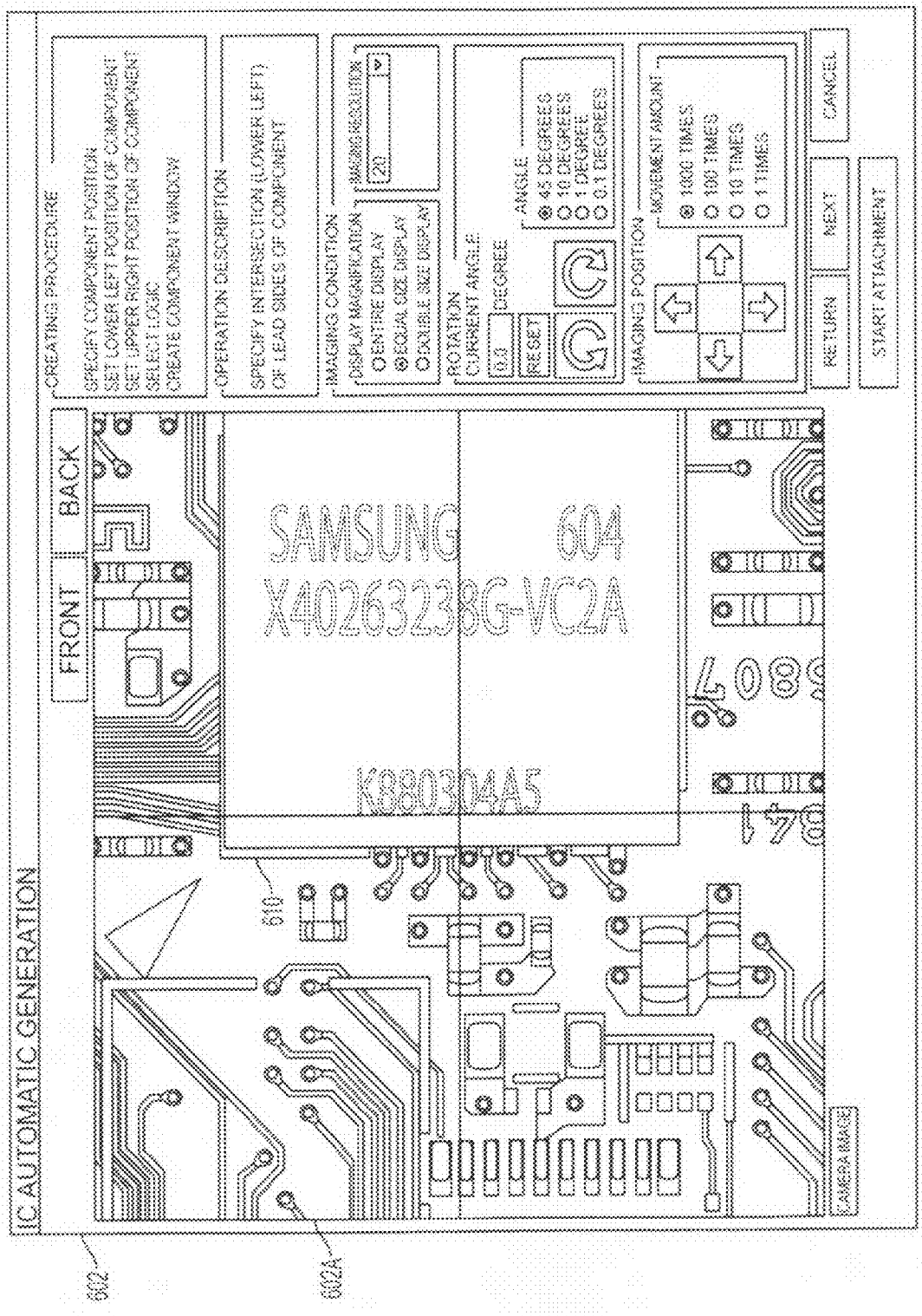
FIG. 8 is a view schematically showing another example of a screen displayed in the BGA attaching process of FIG. 6.
Figure 9A:
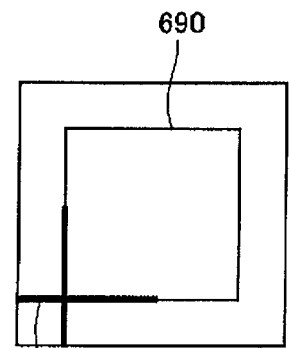
FIGS. 9A to 9C are views describing one example of an input mode of a position of a component in the BGA attaching process of FIG. 6.
Figure 9B:
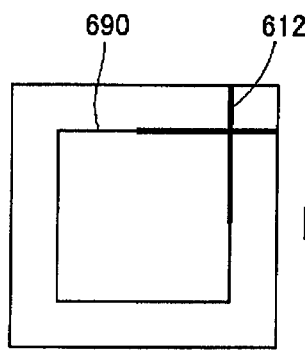
Figure 9C:
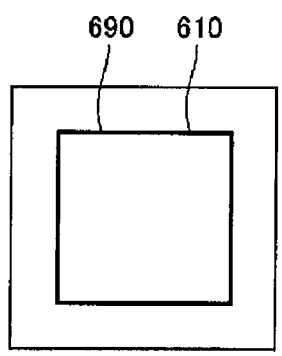

In step S403, a screen such as a screen 602 of FIG. 8 is displayed on the output unit 50. In the display field 602A of the screen 602, the image of the substrate photographed by the optical camera 116 is displayed. The user inputs information for selecting the position of the component to be processed on the input of the examination information from the images displayed in the display field 602A by operating the input unit 40. One example of an input mode of the information for specifying the position of the component will be described with reference to FIGS. 9A to 9C. In FIGS. 9A to 9C, one part of the image displayed in the display field 602A are assumed to be displayed, and the image is assumed to include a component 690.

First, as shown in FIG. 9A, a cursor 611 for determining the lower left coordinate of the component 690 in the displayed image is visually aligned with the lower left of the component 690 by the user, so that information for specifying the position of the lower left end of the component 690 is inputted.

Next, as shown in FIG. 9B, a cursor 612 for determining the upper right coordinate of the component 690 in the displayed image is visually aligned with the upper right of the component 690 by the user, so that information for specifying the position of the upper right end of the component 690 is inputted.

The user appropriately operates the input unit 40 to adjust the positions of the cursors 611, 612.

When the positional information indicated by the cursor 611 of FIG. 9A and the cursor 612 of FIG. 9B are inputted, the X-ray examination apparatus 100 displays a region inputted as the position of the component as a frame 610 based on such positional information, as shown in FIG. 9C. The frame 610 is similarly shown in the display field 602A of FIG. 8.

The CAD data, the mount data, and the like may be used for the input of the information for specifying the position of the component 690, and for instance, the X-ray examination apparatus 100 may display the information acquired from the CAD data and the mount data on the position and the size of the component.

Returning back to FIG. 6, after acquiring the information on the region of the component in step S403, the X-ray examination apparatus 100 determines whether or not the region of the component acquired in step S403 is greater than the maximum size for one reconstruction data in the X-ray examination apparatus 100 in step S405, and divides the component region if greater. The division of the component region will be described with reference to FIG. 10A and FIG. 10B.

Figure 10A:
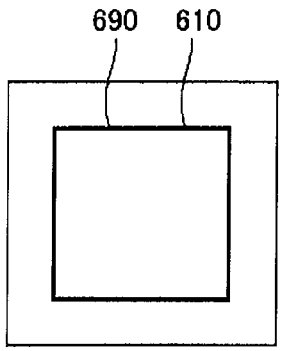
FIGS. 10A and 10B are views describing one example of a mode of dividing a component region in the BGA attaching process of FIG. 6.

FIG. 10A shows one part of the image displayed in the display field 602A, and the frame 610 is shown in the image as a region of the component acquired in step S403. The frame 610 specifies the region of the component in the XY plane. If the size that can generate the reconstruction data in the X-ray examination apparatus 100 is exceeded for the size in an X-direction and the size in a Y-direction of the region specified with the frame 610, the region shown with the frame 610 is divided into a plurality of regions as shown with frames 621 to 624 in FIG. 10B through the process of step S405. Each region (frame 621 to 624) of after the division is smaller than or equal to a maximum size that can generate the reconstruction data in the X-ray examination apparatus 100 in both the size in the X-direction and the size in the Y-direction.

Returning back to FIG. 6, the X-ray examination apparatus 100 images the field of view from a plurality of directions, with the relevant region as the field of view, with respect to a plurality of divided regions (regions specified with frames 621 to 624 in FIG. 10) generated in step S405 in step S407. The imaging referred to herein is imaging the field of view from a plurality of directions by moving the substrate and the X-ray detector 23 so as to draw a circular orbit in the horizontal direction.

In step S409, the X-ray examination apparatus 100 generates the reconstruction data from the imaged images of the plurality of directions obtained by the imaging of step S407.

In step S411, the X-ray examination apparatus 100 then divides the region with respect to the X-direction and the Y-direction for the reconstruction data obtained in step S409. The process of step S411 again divides the divided region of the component region for the XY plane in step S405 for the XY plane, and thus will be appropriately referred to as "re-division".

The re-division of the divided region in step S411 will be described with reference to FIG. 11.

Figure 11:
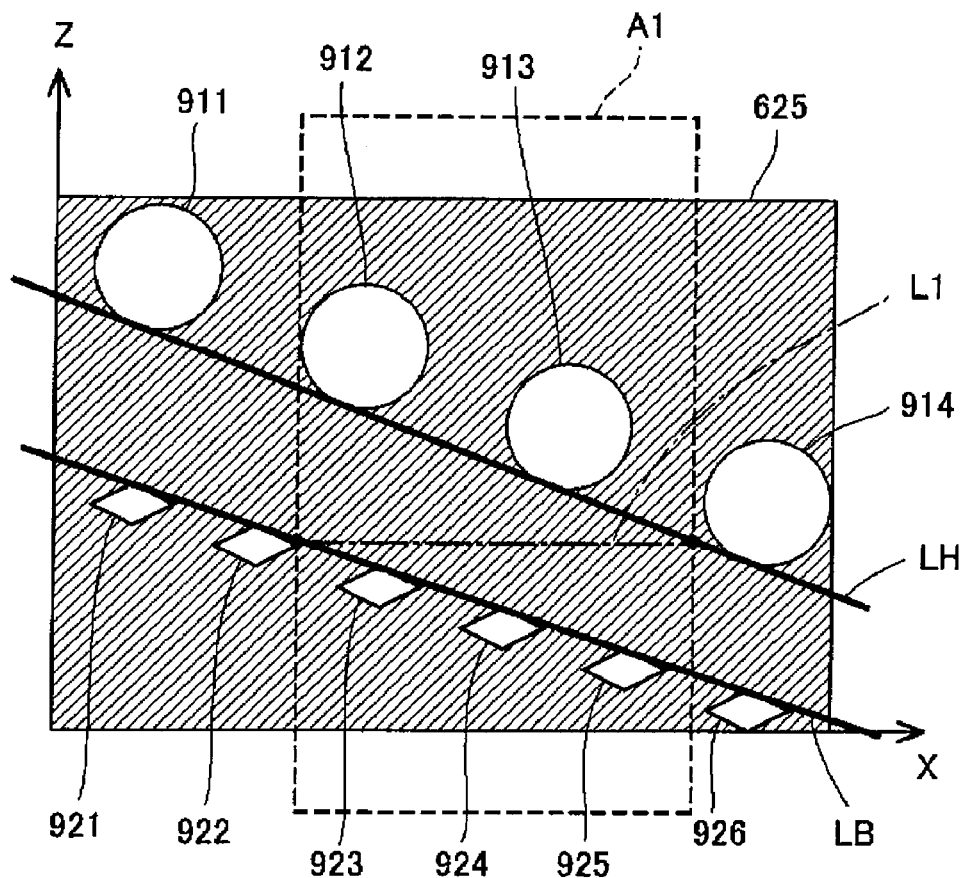
FIG. 11 is a view describing one example of a mode of re-dividing the component region in the BGA attaching process of FIG. 6.

In FIG. 11, a cross-section with respect to the XZ plane of the reconstruction data generated in step S409 is shown. In the cross-sectional image 625, the upper surface of the substrate is indicated with a line LH, and the lower surface is indicated with a line LB. If the line LH and the line LB are slanted, this indicates that the substrate is mounted in a tilted manner. Solder balls 911 to 914, which are wirings for connecting the component to be mounted on one surface of the substrate to the substrate, and components 921 to 926 mounted on the other surface of the substrate are also shown in the cross-sectional image 625.

In FIG. 11, the region A1 indicated with a broken line is a region set as one of the re-divided regions in step S411. A line L1 in the region A1 is shown to describe the mode of re-division, and is a line parallel to the X-axis in FIG. 11. The line L1 has one end in contact with the line LB and the other end in contact with the line LH. The line L1 also has one end in contact with one end in the X-axis direction of the region A1, and the other end in contact with the other end in the X-axis direction of the region A1.

As described above, the region A1 is set as a region with respect to the X-axis direction so that the line L1 parallel to the X-axis has the dimension in the X-axis direction from the area in contact with the line LB to the area in contact with the line LH or shorter than such a range. That is, each region generated by the re-division is such that the image of the member or the solder ball mounted on one surface of the substrate and the image of the member or the solder ball mounted on the other surface do not overlap when the image in each region is projected on the Z-axis even if the substrate is tilted.

In the re-division, the range with respect to the Y-axis direction is also similar, and that the image of the member or the solder ball mounted on one surface of the substrate and the image of the member or the solder ball mounted on the other surface do not overlap when the cross-sectional image with respect to the YZ plane is projected on the Z-axis.

Figure 10B:
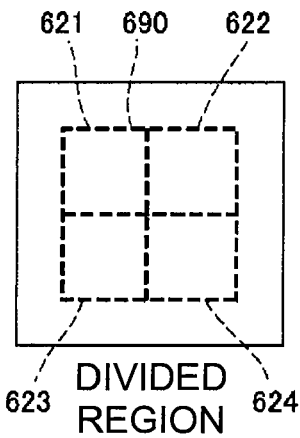
Figure 12:
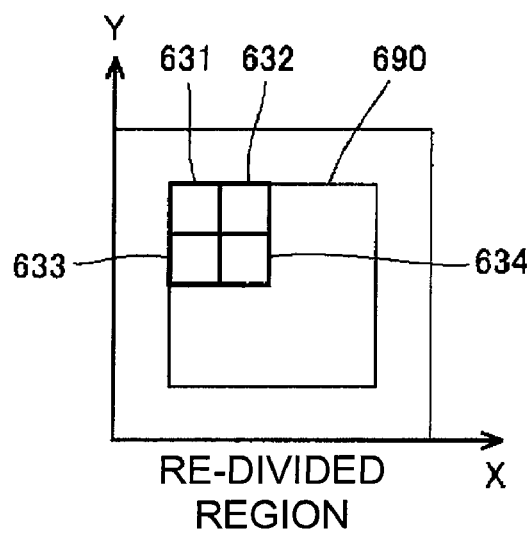
FIG. 12 is a view schematically showing a region after the re-division of the component region in the BGA attaching process of FIG. 6.

In step S411, the re-division of the component region for the X-direction and the Y-direction is carried out in the above manner. Through such re-division, the region 621 after the division described with reference to FIG. 10B is divided into regions 631 to 634 as shown in FIG. 12.

In the cross-sectional image, the region of the substrate is recognized by pattern recognition, and the like.

Returning back to FIG. 6, after step S411, the X-ray examination apparatus 100 determines the region in the Z-axis direction (height region) to be processed in the examination for each re-divided region generated through the process of step S411 in step S413. The determination on the height region in step S413 will be described with reference to FIGS. 13 to 15.

Figure 13A:
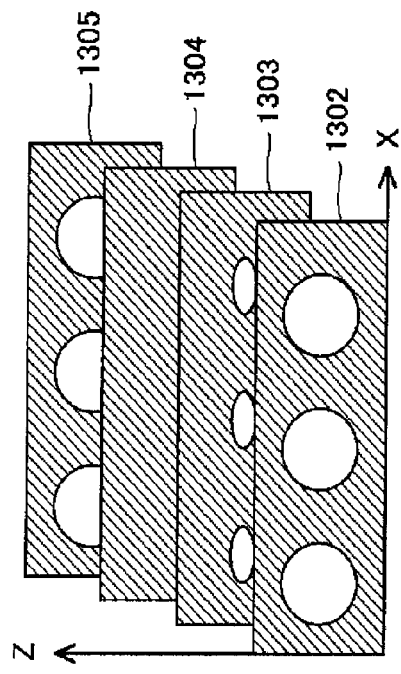
FIGS. 13A to 13D are views describing one example of a mode of determining a height region in the BGA attaching process of FIG. 6.
Figure 13B:
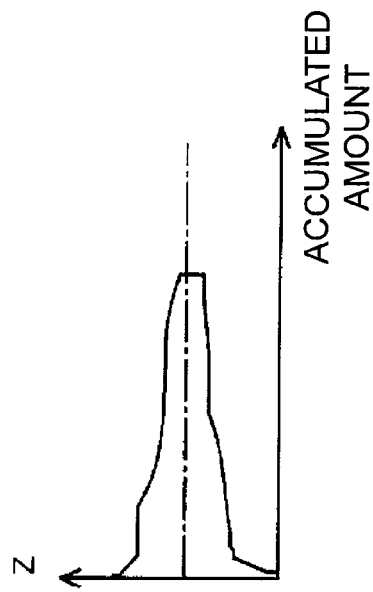
Figure 13C:
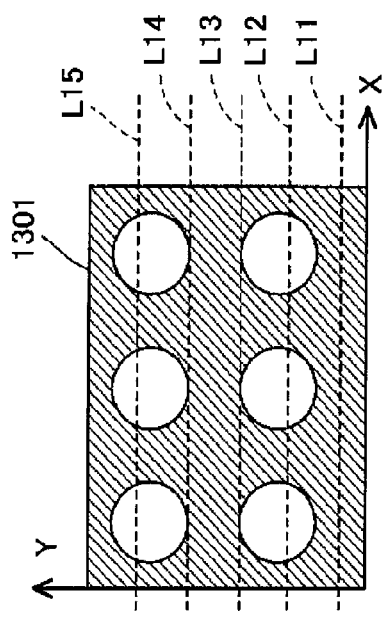

In the determination of the height region, the tomographic image is first obtained at an interval of smaller than or equal to a minimum width in the specification of the solder ball, which is the examination target, in the Y-axis direction from the three-dimensional data of the re-divided region shown as the cross-sectional image 1301 in FIG. 13A. The tomographic image obtained herein may be that of a range inputted by the user for the region on the upper side of the substrate or the region on the lower side of the substrate in the three-dimensional data. In FIG. 13A, one part of the cross-section in the Y-axis direction is shown with lines L11 to L15. The interval in the Y-axis direction for each line L11 to L15 is smaller than or equal to the minimum width in the specification of the solder ball. As shown in FIG. 13B, an image spread in the XZ plane, as shown as images 1302 to 1305, is obtained for each cross-section. As shown with the image 1306 in FIG. 13C, an image in which all of the obtained tomographic images are overlapped is generated.

Figure 13D:
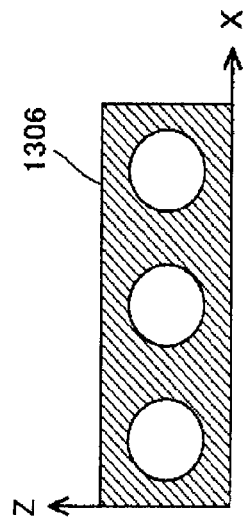

As shown in FIG. 13D, the accumulated amount of the luminance for the Z-axis is calculated for the overlapped image, and the value of Z corresponding to the maximum value is obtained. An integrated image for the XY plane is generated with respect to a predetermined range for Z including the obtained value of Z.

The predetermine range for Z is the maximum value of Z in which the position of a certain surface of the substrate in the re-divided region fluctuates in the Z-axis direction when tilted by the maximum tilt permitted in the specification of the substrate.

Returning back to FIG. 6, after determining the height region in step S413, the X-ray examination apparatus 100 generates an integrated image of the XY plane for the height region in step S415.

Figure 14A:
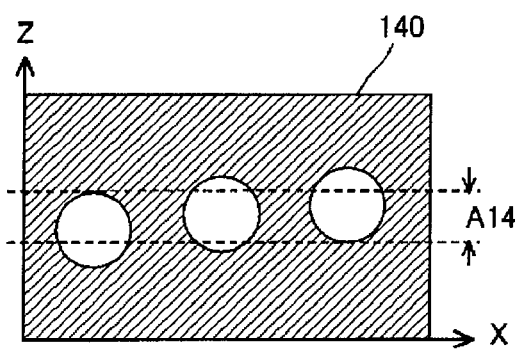
FIGS. 14A to 14C are views describing one example of a mode of determining the height region in the BGA attaching process of FIG. 6.

A predetermined range on the Z determined in step S413 is shown as a range A14 with respect to an XZ cross-section 140 of the three-dimensional data of the re-divided region of FIG. 14A.

Figure 14B:
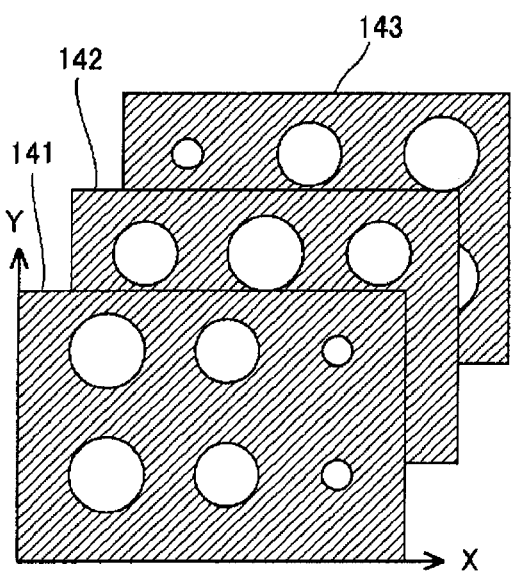
Figure 14C:
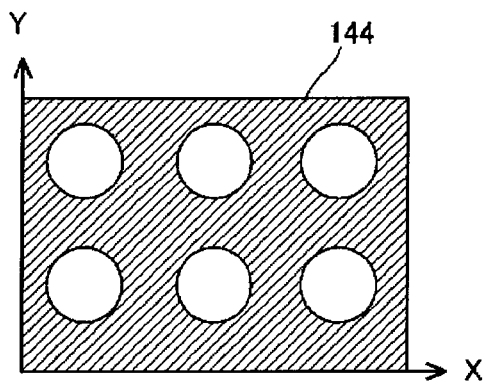

An image in which the XY plane images within the range A14 for the Z-axis direction are overlapped in the re-divided region to be processed is generated. FIG. 14B schematically shows the XY plane images contained in the range as images 141 to 143, and the image in which such images 141 to 143 are overlapped is shown as an image 144 in FIG. 14C.

Returning back to FIG. 6, after step S415, the X-ray examination apparatus 100 acquires information on the number of ball terminals and the like contained in the image by executing processes such as binarization on the integrated image generated in step S415 in step S417.

Specifically, in step S417, labeling of the white (or pixel value 1) portion is performed from the binarized image, a labeling image in which the solder is distinguished is acquired, a coupling component is extracted, that in which the coordinate of the center of the labeled target is contained in the peak for both X and Y is extracted, and the index is given to each coordinate. In indexing, if the same index exists in plurals, the index which center coordinate is close to the center of the peak and the vertical and horizontal widths (width for XY plane) of the image of the corresponding ball terminal are close to the width of the peak is adopted, and the index which area greatly differs from other ball terminals is excluded. Through such indexing, the X-ray examination apparatus 100 can acquire the number of ball terminals contained in the integrated image, as well as, the number of rows and number of columns for the arrangement of the ball terminals.

The peak for X is the X coordinate corresponding to the peak of the accumulated value when the integrated image is projected in the X-axis direction and the accumulated value of the pixel is calculated for every X-coordinate, and the peak for Y is the Y coordinate corresponding to the peak of the accumulated value when the integrated image is projected in the Y-axis direction and the accumulated value of the pixel is calculated for every Y-coordinate.

Returning back to FIG. 6, after step S417, the X-ray examination apparatus 100 determines the resolution on the examination of the component in step S419.

The determination on the resolution of the component includes calculating the average value of the size of the ball terminal extracted in step S419, calculating the number of pixels of the ball terminal size in each resolution that can be adopted in the specification of the X-ray examination apparatus 100, and determining the lowest resolution of the resolutions in which the size of the ball terminal acquired in step S417 exceeds the size of the smallest ball terminal in the specification as the resolution in the examination of the component.

After step S419, the X-ray examination apparatus 100 corrects the coordinate of the center of the ball terminal acquired in step S417 so as to be included in the examination point of when examination is performed in the relevant resolution based on the resolution determined in step S419 in step S421.

After step S421, the X-ray examination apparatus 100 determines whether or not the processes of steps S413 to S421 are executed for all re-divided regions of the component to be processed in step S423, and returns the process to step S413 if determined that the re-divided region that is not yet the processing target exists.

If determined that steps S413 to S421 are executed for all re-divided regions, the X-ray examination apparatus 100 proceeds the process to step S425.

In step S425, the X-ray examination apparatus 100 determines whether or not a process of selecting another component as the target of the BGA attaching process is performed on the input unit 40, and returns the process to step S401 if determined that the process is performed and executes the processes of steps S401 to S423 with respect to the relevant component. If determined that the information for terminating the BGA attaching process is inputted to the input unit 40, the X-ray examination apparatus 100 returns the process.

In the BGA attaching process described above, when the user inputs a two-dimensional region of the component to be examined with respect to the visible light image, the X-ray examination apparatus 100 generates three-dimensional data with respect to the relevant region and analyzes the same to acquire the center coordinate, the number, the number of rows, and the number of columns for the ball terminal connecting the component to the substrate.

The acquired results such as the center coordinate may be displayed on the output unit 50. A display example of the results is shown in FIG. 15.

Figure 15:
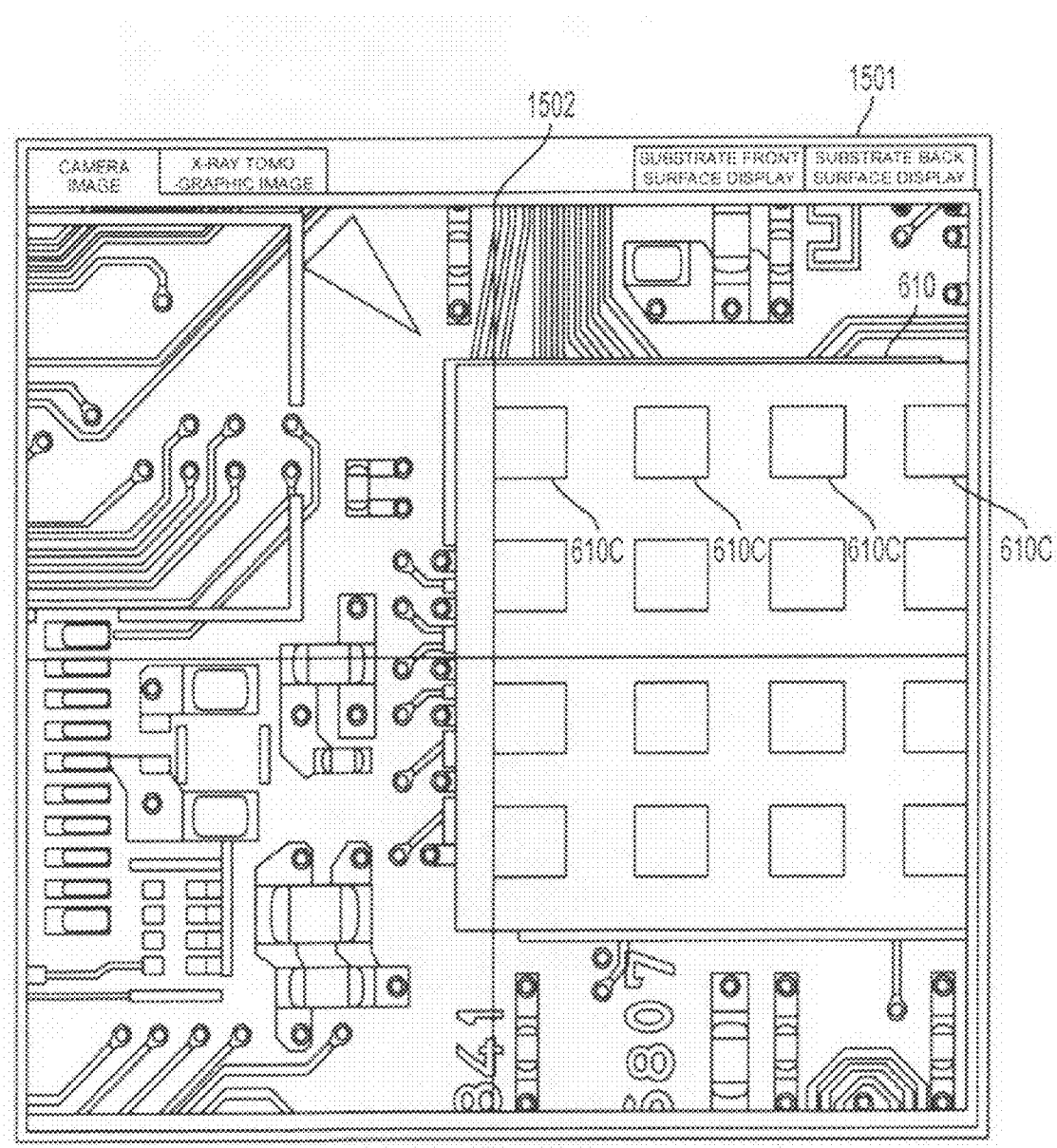
FIG. 15 is a view describing one example of a mode of determining the height region in the BGA attaching process of FIG. 6.

In FIG. 15, a visible light image for the substrate is displayed in a display field 1502 in a screen 1501. In the display field 1502, the frame 610 corresponding to the region acquired in step S403 and the frame 610C corresponding to each solder ball based on the position and the like of the solder ball acquired in step S417 are displayed in accordance with the visible light image.

The X-ray examination apparatus 100 can store the examination logic, the examination region, the position, arrangement, number and the like of the solder ball determined as normal for each BGA in the teaching process even if a plurality of BGAs is mounted with respect to one substrate.

In the component attaching process, a screen 1601 shown in FIG. 16, for example, is displayed on the output unit 50.

With reference to FIG. 16, in the screen 1601, the information on each component (BGA) which is the processing target in the BGA attaching process is displayed for every number acquired in step S401. Specifically, the number acquired in step S401 is displayed for "number" in the display field 1602. Whether the ball terminal exists on one surface or the other surface of the substrate is displayed for "front/back". The number of ball terminals connected to the component is displayed for "number of pins". The number of rows and number of columns of the ball terminal connected to the component are displayed for "number of rows" and "number of columns". The interval in the vertical direction (e.g., Y-axis direction) and the horizontal direction (e.g., X-axis direction) between the center positions of the ball terminals arranged in a matrix form are displayed for "pitch (vertical)" and "pitch (horizontal)". The result of performing the examination with the substrate as the processing target in the teaching process as the target for the examination logic selected with respect to the relevant component is displayed for "state".

In the BGA attaching process, when the processes of steps S401 to S423 are executed for each component, the process of displaying information as shown in the screen 1601 of FIG. 16 may be executed for the components selected up to this point in step S423, for example.

In the BGA attaching process, if determined not to select further component in step S425, the process of displaying information as shown in the screen 1601 of FIG. 16 may be executed for all components of the processing target in steps S401 to S423.

(QFP Attaching Process)

Figure 17:
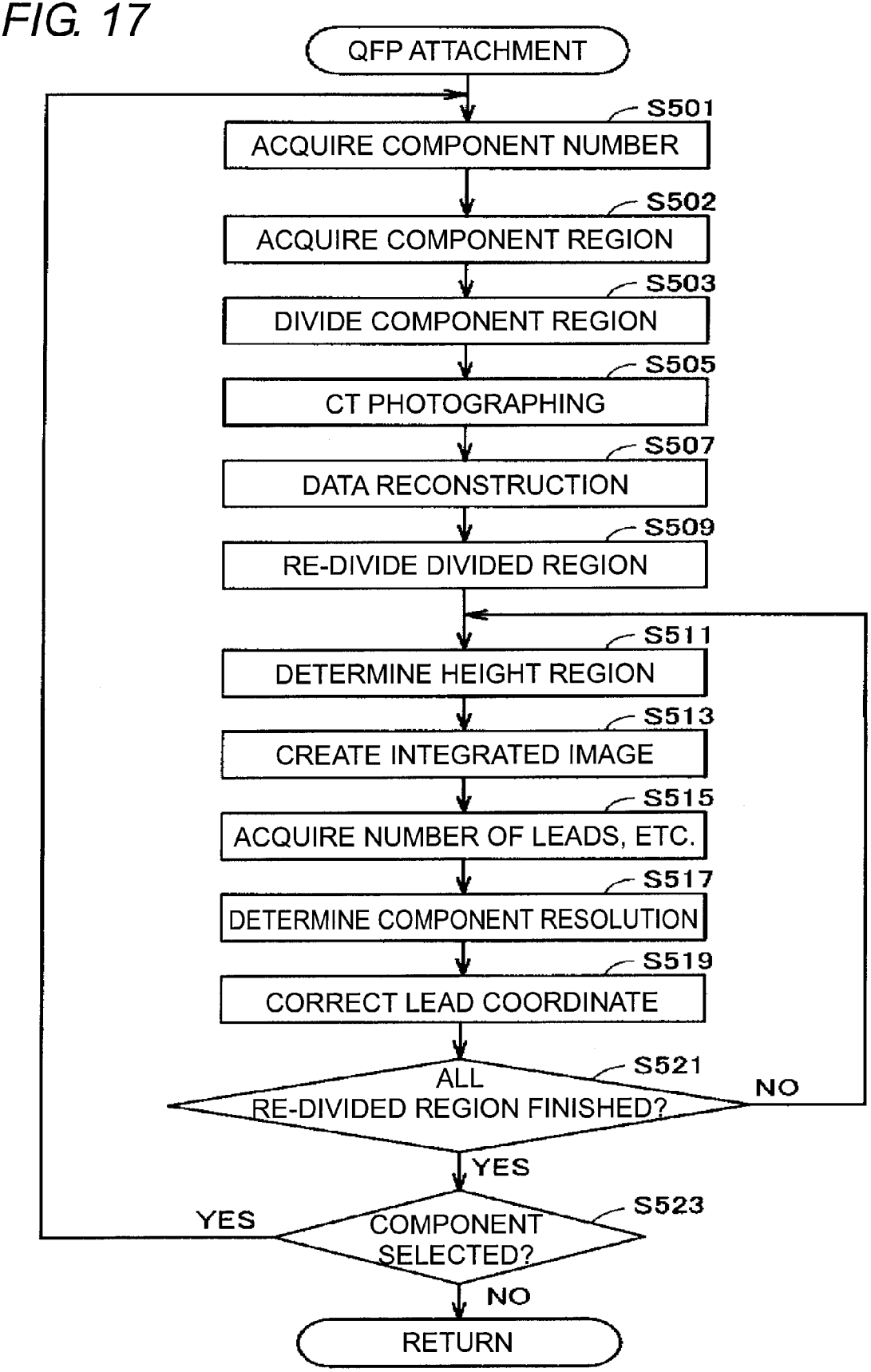
FIG. 17 is a flowchart of a sub-routine of a QFP attaching process of FIG. 5.

FIG. 17 is a flowchart of a sub-routine of the QFP attaching process in step S5.

With reference to FIG. 17, in the QFP attaching process, the X-ray examination apparatus 100 first acquires specification of a number for the component to be processed in step S501. The component to be processed refers to one QFP in a plurality of QFPs mounted on the substrate which is the examination target 1.

Figure 18A:
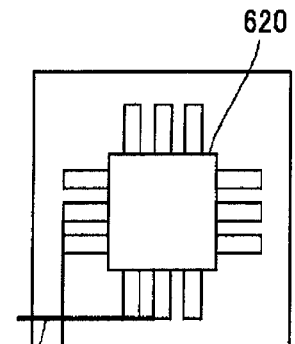
FIGS. 18A to 18C are views describing one example of an input mode of information specifying a position of a component in the QFP attaching process of FIG. 17.
Figure 18B:
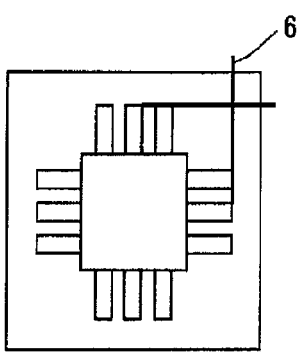
Figure 18C:
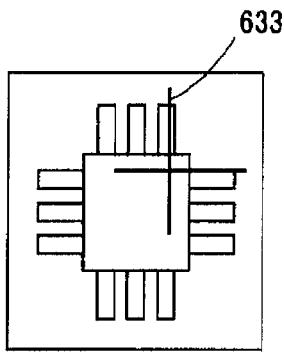

In step S502, the X-ray examination apparatus 100 acquires the information specified as the region of the component on the substrate, and proceeds the process to step S503. One example of the input mode of the information specifying the position of the component will be described with reference to FIGS. 18A to 18C. In FIGS. 18A to 18C, one part of the image displayed in the display field 602A is displayed, and the component 620 is contained in the image.

First, as shown in FIG. 18A, the information specifying the position of the lower left end of the component 620 is inputted by having the user visually align the cursor 631 for determining the coordinate of the lower left of the component 690 in the displayed image to the lower left of the component 620.

As shown in FIG. 18B, the information specifying the position of the upper right end of the component 620 is inputted by having the user visually align the cursor 632 for determining the coordinate of the upper right of the component 620 in the displayed image to the upper right of the component 620.

Furthermore, as shown in FIG. 18C, the information specifying the position of the upper right end of the main body of the component 620 is inputted by having the user visually align the cursor 633 for determining the coordinate of the upper right of the main body of the component 620 in the displayed image to the relevant position of the component 620.

The user appropriately operates the input unit 40 to adjust the positions of the cursors 631, 632, and 633.

Figure 19:
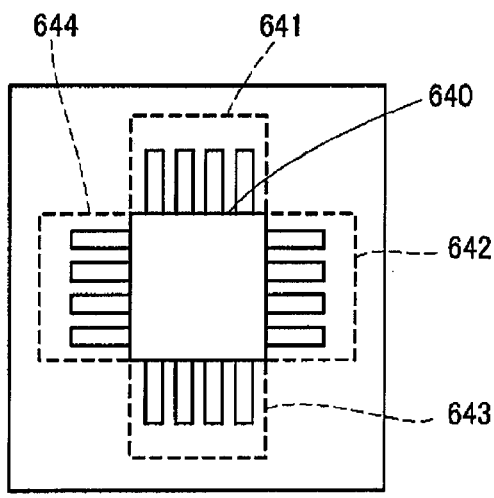
FIG. 19 is a view showing one example of a screen displayed in the QFP attaching process of FIG. 17.

When the positional information indicated by the cursors 611, 612, 613 are inputted, the X-ray examination apparatus 100 displays a region inputted as the position of the component as the frames 640 to 644, as shown in FIG. 19 based on the positional information. The frame 640 corresponds to the component main body, and the frames 641 to 644 correspond to the lead of the components.

The CAD data, the mount data, and the like may be used for the input of the information for specifying the position of the component 620, and for instance, the X-ray examination apparatus 100 may display the information acquired from the CAD data and the mount data on the position and the size of the component.

Returning back to FIG. 17, after acquiring the information on the region of the component in step S502, the X-ray examination apparatus 100 determines whether or not the region of the component acquired in step S502 is greater than the maximum size for one reconstruction data in the X-ray examination apparatus 100 in step S503, and divides the component region if greater.

With the region as the field of view, the X-ray examination apparatus 100 then images the field of view from a plurality of directions with respect to each of the plurality of divided regions in step S505. Imaging herein refers to moving the substrate and the X-ray detector 23 so as to draw a circular orbit in the horizontal direction and imaging the field of view from a plurality of directions.

In step S507, the X-ray examination apparatus 100 generates the reconstruction data from the imaged images in the plurality of directions obtained by the imaging in step S507.

In step S509, the X-ray examination apparatus 100 then divides the region with respect to the X-direction and the Y-direction for the reconstruction data obtained in step S507. Similar to the re-division for the BGA, the range related to the X-axis is divided such that images of the member and the solder ball mounted on the other surface does not overlap when the cross-sectional image for the XZ plane is projected in the Z-axis, and the range related to the Y-axis is divided such that the image of the member and the solder ball mounted on one surface of the substrate and the image of the member and the solder ball mounted on the other surface do not overlap when the cross-sectional image for the YZ plane is projected in the Z-axis.

In step S511, the X-ray examination apparatus 100 determines the region in the Z-axis direction (height region) to be processed in the examination for each re-divided region. The determination on the height region in step S511 will be described with reference to FIG. 20.

Figure 20A:
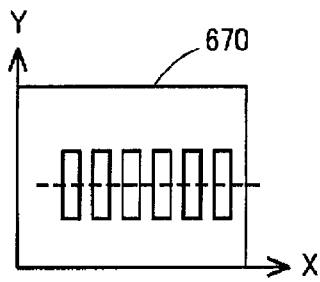
FIGS. 20A to 20C are views describing one example of a mode of determining a height region in the QFP attaching process of FIG. 17.
Figure 20B:
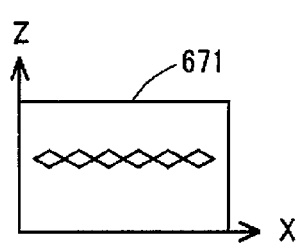

In the determination of the height region, the tomographic image of the cross-section (XZ plane) in the Y-axis direction with respect to the region corresponding to the lead as shown as frames 641 to 644 in FIG. 19 is first obtained from the three-dimensional data of the re-divided region shown as the cross-sectional image 670 in FIG. 20A. One example of the cross-sectional image obtained herein is shown as a cross-sectional image 671 in FIG. 20B.

Figure 20C:
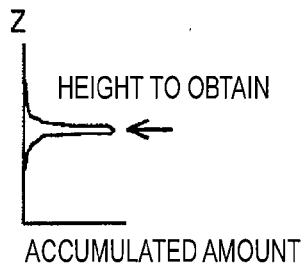

As shown in FIG. 20C, the accumulated amount of the luminance for the Z-axis is calculated for the cross-sectional image 671, and the value of Z corresponding to the maximum value is obtained. An integrated image for the XY plane is generated with respect to a predetermined range for Z including the obtained value of Z. The predetermine range for Z is the maximum value of Z in which the position of a certain surface of the substrate in the re-divided region fluctuates in the Z-axis direction when tilted by the maximum tilt permitted in the specification of the substrate.

Returning back to FIG. 17, after determining the height region in step S511, the X-ray examination apparatus 100 generates an integrated image of the XY plane for the height region in step S513. A mode of generating the integrated image will be described with reference to FIG. 21.

Figure 21A:
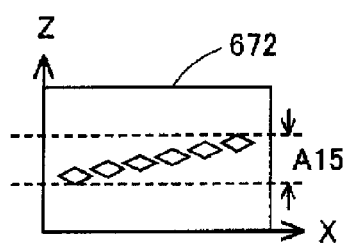
FIGS. 21A to 21C are views describing one example of a mode of generating an integrated image in the QFP attaching process of FIG. 17.

A predetermined range on the Z determined in step S511 is shown as a range A15 with respect to an XZ cross-section 672 of the three-dimensional data of the re-divided region of FIG. 21A.

Figure 21B:
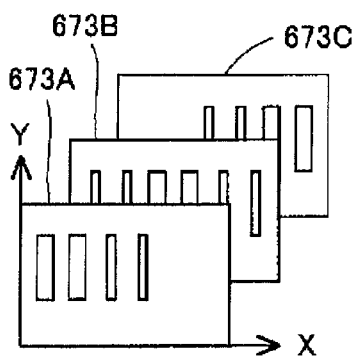
Figure 21C:
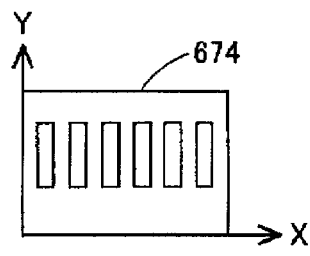

An image in which the XY plane images within the range A15 for the Z-axis direction are overlapped in the re-divided region to be processed is generated. FIG. 21B schematically shows the XY plane images contained in the range as images 673A to 673C, and the image in which such images 673A to 673C are overlapped is shown as an image 674 in FIG. 21C.

Returning back to FIG. 17, after step S513, the X-ray examination apparatus 100 acquires information on the number of leads and the like contained in the image by executing processes such as binarization on the integrated image generated in step S513 in step S515.

Figure 22A:
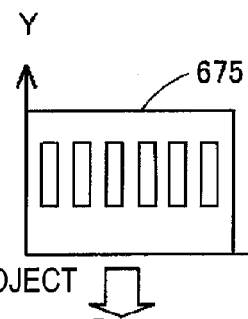
FIGS. 22A to 22C are views describing a mode of acquiring information such as number of lead in the QFP attaching process of FIG. 17.
Figure 22B:
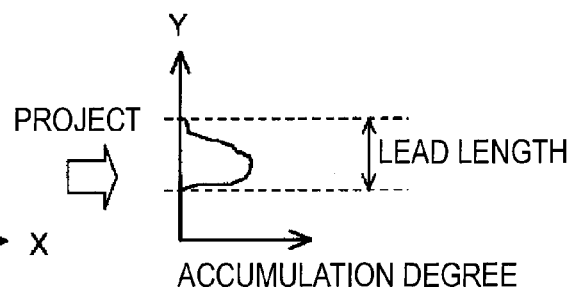
Figure 22C:
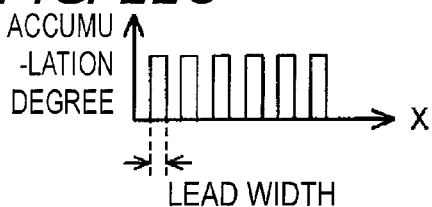

The mode of acquiring the information such as the number of leads will be described with reference to FIG. 22. In step S515, the binarized image 675 (FIG. 22A) is projected in the Y-direction and the Z-direction and the accumulated value of the pixels for each axis is calculated (FIG. 22B, FIG. 22C), the width and the height of the peak in the lead direction are verified, and the lead is extracted from the projection image under the condition of substantially equal interval and equal width. The number of leads, the number columns, and the like contained in the re-divided region to be processed are thereby acquired.

Returning back to FIG. 17, after step S515, the X-ray examination apparatus 100 determines the resolution on the examination of the component in step S517.

The determination on the resolution of the component includes calculating the average value of the size of the lead extracted in step S515, calculating the number of pixels of the lead size in each resolution that can be adopted in the specification of the X-ray examination apparatus 100, and determining the lowest resolution of the resolutions in which the size of the lead acquired in step S515 exceeds the size of the smallest lead in the specification as the resolution in the examination of the component.

In step S519, the X-ray examination apparatus 100 corrects the coordinate (lead width, lead length, lead position (center positions in X-direction and Y-direction of lead) for the lead acquired in step S515 so as to be included in the examination point of when examination is performed in the relevant resolution based on the resolution determined in step S517.

The X-ray examination apparatus 100 determines whether or not the processes of steps S511 to S519 are executed for all re-divided regions of the component to be processed in step S521, and returns the process to step S511 if determined that the re-divided region that is not yet the processing target exists.

If determined that steps S511 to S519 are executed for all re-divided regions, the X-ray examination apparatus 100 proceeds the process to step S523.

In step S523, the X-ray examination apparatus 100 determines whether or not a process of selecting another component as the target of the QFP attaching process is performed on the input unit 40, and returns the process to step S501 if determined that the process is performed and executes the processes of steps S501 to S523 with respect to the relevant component. If determined that the information for terminating the QFP attaching process is inputted to the input unit 40, the X-ray examination apparatus 100 returns the process.

The embodiments disclosed herein are illustrative in all aspects and should not be recognized as exclusive. The scope of the invention is indicated by the claims rather than by the description made above, and it should be apparent that all modifications equivalent in meaning to the claims and within the scope of the invention are encompassed. The technical ideas described in each embodiment are intended to be implemented by being combined as much as possible.

What is claimed is:

1. An X-ray examination region setting method of setting an examination region for examining a substrate using X-rays, the method comprising the steps of:

displaying a visible light image obtained by photographing the substrate from a perpendicular direction with respect to a substrate surface;

accepting input of information for specifying a range within which a component mounted on the substrate is present in the displayed image;

generating three-dimensional reconstruction data from an X-ray fluorography image obtained by performing X-ray fluorography on a three-dimensional region including a region of the component within the specified range;

determining information on a position of a wiring connecting the substrate and the component by processing the three-dimensional reconstruction data; and determining, from the determined information on the position of the wiring, a region corresponding to the wiring within the three-dimensional region, and setting the determined region as the examination region;

in the step of determining the information on the position of the wiring, data of a predetermined range in the perpendicular direction in the three-dimensional reconstruction data is taken as processing target, the predetermined range includes a position in the perpendicular direction where an accumulated value of luminance has a peak, the accumulated value of luminance being calculated at each position in the perpendicular direction from data obtained by overlapping, in a tomographic depth direction, pixels of a plurality of cross-sectional images parallel to each other and to the perpendicular direction of the three-dimensional reconstruction data.

2. The X-ray examination region setting method according to claim 1, further comprising a step of displaying the set examination region and the visible light image in superimposed manner.

3. The X-ray examination region setting method according to claim 1, wherein the predetermined range includes the position in the perpendicular direction where the accumulated value of the luminance has a peak, and is the range within which the position in the perpendicular direction fluctuates due to an assumed tilt of the substrate in a range of the three-dimensional reconstruction data to be processed.

4. An X-ray examination apparatus for examining a substrate using X-rays, the X-ray examination apparatus comprising:

a visible light image capturing unit for capturing a visible light image of the substrate from a direction perpendicular to a substrate surface;

a display unit for displaying the captured visible light image;

an input unit for inputting information for specifying a range within which a component mounted on the substrate is present in the displayed image;

an X-ray image capturing unit for capturing an X-ray fluorography image;

an image generation unit for generating a three-dimensional reconstruction image from the X-ray fluorography image captured by the X-ray image capturing unit with respect to a three-dimensional region including the range within which the component is present, specified by the input unit;

a determination unit for determining information on a position of a wiring connecting the substrate and the component by processing data of the three-dimensional reconstruction image; and a setting unit for determining a region corresponding to the wiring in the three-dimensional region from the determined information on the position of the wiring, and setting the determined region as an examination region;

wherein the determination unit is configured to take as a processing target, in determining the information on the position of the wiring, data of a predetermined range in the perpendicular direction in the three-dimensional reconstruction data is taken, and the predetermined range includes a position in the perpendicular direction where an accumulated value of luminance has a peak, the accumulated value of luminance being calculated at each position in the perpendicular direction from data obtained by overlapping, in a tomographic depth direction, pixels of a plurality of cross-sectional images parallel to each other and to the perpendicular direction of the three-dimensional reconstruction data.

5. A computer program product on a non-transitory, computer-readable storage medium, the computer program product comprising a computer-readable X-ray examination region setting program for setting an examination region for examining a substrate using X-rays, the program being configured to cause, when executed by a computer of an X-ray examination apparatus, the computer of the X-ray examination apparatus to execute the steps of:

displaying a visible light image obtained by photographing the substrate;

accepting input information for specifying a position of a component mounted on the substrate and a range in which the component is positioned, with respect to the displayed image;

generating three-dimensional reconstruction data based on an X-ray fluorography image of the specified range in which the component is positioned;

determining information on the position of a wiring connecting the substrate and the component by processing the three-dimensional reconstruction data; and determining a region corresponding to the wiring from the determined information on the position of the wiring, and displaying the determined region so as to be aligned with the position in the visible light image;

wherein, in the step of determining the information on the position of the wiring, data of a predetermined range in the perpendicular direction in the three-dimensional reconstruction data is taken as processing target, and the predetermined range includes a position in the perpendicular direction where an accumulated value of luminance has a peak, the accumulated value of luminance being calculated at each position in the perpendicular direction from data obtained by overlapping, in a tomographic depth direction, pixels of a plurality of cross-sectional images parallel to each other and to the perpendicular direction of the three-dimensional reconstruction data.

* * * * *